United States Patent
Wang et al.

(10) Patent No.: US 12,137,024 B2
(45) Date of Patent: **\*Nov. 5, 2024**

(54) NETWORK MANAGEMENT ACTIONS BASED ON ACCESS POINT CLASSIFICATION

(71) Applicant: Juniper Networks, Inc., Sunnyvale, CA (US)

(72) Inventors: Wenfeng Wang, Cupertino, CA (US); Jisheng Wang, Palo Alto, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/453,872

(22) Filed: Aug. 22, 2023

(65) Prior Publication Data

US 2023/0396485 A1    Dec. 7, 2023

Related U.S. Application Data

(63) Continuation of application No. 17/402,215, filed on Aug. 13, 2021, now Pat. No. 11,770,290.

(51) Int. Cl.
    *H04L 41/0631* (2022.01)
    *H04W 88/08* (2009.01)

(52) U.S. Cl.
    CPC ......... *H04L 41/0631* (2013.01); *H04W 88/08* (2013.01)

(58) Field of Classification Search
    None
    See application file for complete search history.

(56) References Cited

U.S. PATENT DOCUMENTS

| 5,737,739 A | 4/1998 | Shirley et al. |
| 7,536,595 B1 | 5/2009 | Hiltunen et al. |

(Continued)

FOREIGN PATENT DOCUMENTS

| CN | 101507185 A | 8/2009 |
| CN | 106130780 A | 11/2016 |

(Continued)

OTHER PUBLICATIONS

"Betweenness centrality," Wikipedia, The Free Encyclopedia, last edited on Apr. 18, 2021, Retrieved from: https://web.archive.org/web/20210418161442/https://en.wikipedia.org/wiki/Betweenness_centrality, accessed Nov. 19, 2021, 7 pp.

(Continued)

*Primary Examiner* — Lonnie V Sweet
(74) *Attorney, Agent, or Firm* — Shumaker & Sieffert, P.A.

(57) ABSTRACT

An example system includes access point (AP) devices configured to provide a wireless network at a site; and a network management system that stores network data received from the AP devices, the network data collected by the AP devices or client devices associated with the wireless network, and one or more processors configured to: receive a time series of SLE metrics based on the network data, determine, based on the time series, whether a network event has occurred, in response to a determination that a network event has occurred, determine a root cause for the network event, and in response to a determination that the root cause of the network event is associated with an AP device, determine a classification of the AP device, and determine a network management action for the AP device based on the network event and the classification of the AP device.

20 Claims, 12 Drawing Sheets

(56) References Cited

U.S. PATENT DOCUMENTS

| | | | |
|---|---|---|---|
| 8,051,330 | B2 | 11/2011 | Cinato et al. |
| 8,073,806 | B2 | 12/2011 | Garg et al. |
| 8,423,047 | B1 | 4/2013 | Zang et al. |
| 9,832,082 | B2 | 11/2017 | Dade et al. |
| 10,079,734 | B1 | 9/2018 | Gegout et al. |
| 10,200,884 | B2 | 2/2019 | Tan et al. |
| 10,270,644 | B1 | 4/2019 | Valsecchi et al. |
| 10,419,274 | B2 | 9/2019 | Stephens et al. |
| 10,419,954 | B1 * | 9/2019 | Konstantakopoulos ............ H04W 16/18 |
| 10,470,077 | B1 | 11/2019 | Kodaypak et al. |
| 10,862,742 | B2 | 12/2020 | Singh |
| 10,958,537 | B2 | 3/2021 | Safavi |
| 10,958,543 | B2 | 3/2021 | Dade et al. |
| 10,958,585 | B2 | 3/2021 | Safavi |
| 10,985,969 | B2 | 4/2021 | Safavi |
| 11,099,928 | B1 | 8/2021 | Vah et al. |
| 11,381,499 | B1 | 7/2022 | Ramaswamy et al. |
| 11,516,725 | B1 | 11/2022 | Martin |
| 11,570,038 | B2 | 1/2023 | Wang et al. |
| 11,677,612 | B2 | 6/2023 | Safavi |
| 11,770,290 | B2 * | 9/2023 | Wang ............ H04L 41/00 370/241 |
| 2001/0011260 | A1 | 8/2001 | Skaanning et al. |
| 2004/0202159 | A1 | 10/2004 | Matsubara et al. |
| 2005/0050377 | A1 | 3/2005 | Chan et al. |
| 2005/0265255 | A1 | 12/2005 | Kodialam et al. |
| 2007/0066297 | A1 | 3/2007 | Heidari-Bateni |
| 2007/0260911 | A1 | 11/2007 | Marilly et al. |
| 2010/0091676 | A1 | 4/2010 | Moran et al. |
| 2011/0231704 | A1 | 9/2011 | Ge et al. |
| 2012/0243474 | A1 * | 9/2012 | Iyer ............ H04L 63/1466 370/328 |
| 2014/0036656 | A1 | 2/2014 | Chou et al. |
| 2014/0119196 | A1 | 5/2014 | Hui et al. |
| 2014/0136690 | A1 | 5/2014 | Jain |
| 2014/0160941 | A1 | 6/2014 | Hui et al. |
| 2014/0172371 | A1 | 6/2014 | Zhu et al. |
| 2014/0269269 | A1 | 9/2014 | Kovvali et al. |
| 2014/0315538 | A1 | 10/2014 | Hamalainen et al. |
| 2014/0321311 | A1 | 10/2014 | Groenendijk et al. |
| 2014/0355454 | A1 | 12/2014 | Serban et al. |
| 2015/0017975 | A1 | 1/2015 | Sanneck et al. |
| 2015/0074035 | A1 | 3/2015 | Narasappa |
| 2015/0215910 | A1 * | 7/2015 | Han ............ H04W 56/0045 370/329 |
| 2015/0304191 | A1 | 10/2015 | Groenendijk et al. |
| 2016/0112894 | A1 | 4/2016 | Lau et al. |
| 2016/0162346 | A1 | 6/2016 | Kushir et al. |
| 2016/0226740 | A1 | 8/2016 | Van Oost et al. |
| 2016/0286409 | A1 | 9/2016 | Kravets et al. |
| 2016/0323763 | A1 | 11/2016 | Xu et al. |
| 2016/0352599 | A1 | 12/2016 | Hui et al. |
| 2017/0019291 | A1 | 1/2017 | Tapia et al. |
| 2017/0126445 | A1 | 5/2017 | Hamouda et al. |
| 2017/0200088 | A1 | 7/2017 | Yang et al. |
| 2017/0272319 | A1 | 9/2017 | Sheen |
| 2017/0364819 | A1 | 12/2017 | Yang |
| 2017/0366993 | A1 | 12/2017 | Bejerano et al. |
| 2018/0048427 | A1 | 2/2018 | Ganjam et al. |
| 2018/0048527 | A1 | 2/2018 | Ganjam et al. |
| 2018/0295528 | A1 | 10/2018 | Anantha et al. |
| 2018/0332481 | A1 | 11/2018 | Veggalam et al. |
| 2019/0163594 | A1 | 5/2019 | Hayden et al. |
| 2019/0215796 | A1 | 7/2019 | Poosamani et al. |
| 2019/0347148 | A1 | 11/2019 | Gomes Pereira et al. |
| 2019/0356553 | A1 | 11/2019 | Mermoud et al. |
| 2019/0373007 | A1 | 12/2019 | Salunke et al. |
| 2020/0022016 | A1 | 1/2020 | Fenoglio et al. |
| 2020/0099592 | A1 | 3/2020 | Mahindru et al. |
| 2020/0128446 | A1 | 4/2020 | Singh et al. |
| 2020/0145851 | A1 | 5/2020 | Berlin et al. |
| 2020/0162889 | A1 | 5/2020 | Desai et al. |
| 2020/0382361 | A1 | 12/2020 | Chandrasekhar et al. |
| 2021/0012115 | A1 | 1/2021 | Bodbyl et al. |
| 2021/0034994 | A1 | 2/2021 | Stocker et al. |
| 2021/0037395 | A1 | 2/2021 | Veggalam et al. |
| 2021/0044477 | A1 | 2/2021 | Singh |
| 2021/0089927 | A9 | 3/2021 | Ryan et al. |
| 2021/0092036 | A1 | 3/2021 | Jain et al. |
| 2021/0097411 | A1 | 4/2021 | Guntur |
| 2021/0112034 | A1 | 4/2021 | Sundararajan et al. |
| 2021/0133594 | A1 | 5/2021 | Dinh et al. |
| 2021/0135929 | A1 | 5/2021 | Liu et al. |
| 2021/0160263 | A1 | 5/2021 | Jiang et al. |
| 2021/0168084 | A1 | 6/2021 | Safavi |
| 2021/0176143 | A1 | 6/2021 | Dade et al. |
| 2021/0211915 | A1 * | 7/2021 | Chen ............ H04W 24/10 |
| 2021/0226841 | A1 | 7/2021 | Liu et al. |
| 2021/0226855 | A1 | 7/2021 | Safavi |
| 2021/0234622 | A1 | 7/2021 | Singh et al. |
| 2021/0306201 | A1 | 9/2021 | Wang et al. |
| 2021/0374567 | A1 | 12/2021 | Bhimireddy et al. |
| 2021/0377839 | A1 | 12/2021 | Desai et al. |
| 2021/0390423 | A1 * | 12/2021 | Latapie ............ H04L 41/0631 |
| 2022/0191714 | A1 * | 6/2022 | Vuggrala ............ H04W 48/20 |
| 2022/0231903 | A1 | 7/2022 | Thampy et al. |
| 2022/0255813 | A1 | 8/2022 | Sandhu et al. |
| 2022/0321439 | A1 | 10/2022 | Park et al. |
| 2022/0337495 | A1 | 10/2022 | Safavi |
| 2022/0377639 | A1 | 11/2022 | Desai et al. |
| 2023/0020899 | A1 | 1/2023 | Zohoorian et al. |
| 2023/0053044 | A1 | 2/2023 | Wang et al. |
| 2023/0189315 | A1 | 6/2023 | Haustein |
| 2023/0189382 | A1 | 6/2023 | Haustein |
| 2023/0261931 | A1 | 8/2023 | Safavi |

FOREIGN PATENT DOCUMENTS

| | | |
|---|---|---|
| CN | 108768702 A | 11/2018 |
| CN | 111585781 A | 8/2020 |
| EP | 3407541 A1 | 11/2018 |
| EP | 3700133 A1 | 8/2020 |
| EP | 3758295 A1 | 12/2020 |
| EP | 3799356 A1 | 3/2021 |
| JP | 2009509412 A | 3/2009 |
| JP | 2011028339 A | 2/2011 |
| JP | 2017509169 A | 3/2014 |
| JP | 2018506245 A | 3/2018 |
| JP | 2018514103 A | 5/2018 |
| JP | 2019536397 A | 12/2019 |
| JP | 2020137126 A | 8/2020 |
| WO | 2016107982 A1 | 7/2016 |
| WO | 2018093916 A1 | 5/2018 |
| WO | 2020150564 A1 | 7/2020 |

OTHER PUBLICATIONS

Extended Search Report from counterpart European Application No. 22190173.9 dated Dec. 8, 2022, 10 pp.

Gencaga, D, et al., "Survey on the Estimation of Mutual Information Methods as a Measure of Dependency Versus Correlation Analysis", AIP Conference Proceedings 1636, 80, (Jan. 2014), 10 pgs.

IEEE Std 802.11ad-2012: "Part 11: Wireless LAN Medium Access Control (MAC) and Physical Layer (PHY) Specifications—Amendment 3: Enhancements for Very High Throughput in the 60 GHz Band", LAN/MAN Standards Committee of the IEEE Computer Society, Dec. 28, 2012, 628 Pages.

Mist, "Enabling the AI-Driven Enterprise", Solution Brief | Mist Platform, Jul. 2020, 4 pp., Retrieved from the Internet on Dec. 8, 2021 from URL: https://www.juniper.net/content/dam/www/assets/solution-briefs/us/en/enabling-the-ai-driven-enterprise.pdf.

Prosecution History from U.S. Appl. No. 17/402,215, dated Jan. 20, 2023 through May 10, 2023, 42 pp.

Response to Extended Search Report dated Dec. 8, 2022, from counterpart European Application No. 22190173.9 filed Aug. 11, 2023, 23 pp.

Safavi, "Baysian Inference: a Key Building Block of AN AI Foundation," The New Stack, Retrieved May 21, 2021 from: https://thenewstack.io/bayesian-inference-a-key-building-block-of-an-ai-foundation/, Jul. 9, 2018, 15 pp.

(56) References Cited

OTHER PUBLICATIONS

Safavi, "Building Blocks for AI: Mutual Information and the Pearson Correlation," The New Stack, Retrieved May 21, 2021 from: https://thenewstack.io/mutual-information-pearson-correlationbuilding-blocks-ai/, Mar. 23, 2018, 15 pp.

* cited by examiner

NETWORK MANAGEMENT ACTIONS BASED ON ACCESS POINT CLASSIFICATION

PRIORITY CLAIM

This application claims priority to U.S. application Ser. No. 17/402,215, filed Aug. 13, 2021, entitled "NETWORK MANAGEMENT ACTIONS BASED ON ACCESS POINT CLASSIFICATION," the entire content of which is incorporated herein by reference.

FIELD

The disclosure relates generally to computer networks and, more specifically, automated techniques for performing network management actions based on a classification of an access point.

BACKGROUND

Wireless access networks make use of network of wireless access points (APs), which are physical, electronic devices that enable other devices to wirelessly connect to a wired network using various wireless networking protocols and technologies, such as wireless local area networking protocols conforming to one or more of the IEEE 802.11 standards (i.e., "Wi-Fi"), Bluetooth/Bluetooth Low Energy (BLE), mesh networking protocols such as ZigBee or other wireless networking technologies. Many different types of wireless client devices, such as laptop computers, smartphones, tablets, wearable devices, appliances, and Internet of Things (IoT) devices, incorporate wireless communication technology and can be configured to connect to wireless access points when the device is in range of a compatible wireless access point in order to access a wired network.

Wireless access networks, and computer networks in general, are complex systems which may experience transient and/or permanent issues. Some of the issues may result in noticeable system performance degradation while other issues may resolve themselves without substantially affecting the system level performance as perceived by the users. Some issues may be expected and accepted under a heavy load and as soon as the load subsides, self-healing mechanisms, such as a retry, etc. may cause the issue to go away. Other self-healing network may involve operations such as automatically invoking restart of certain components.

SUMMARY

In general, this disclosure describes techniques for performing network management actions based on a classification of an access point. A network management system (NMS) receives network data associated with a plurality of client devices in a wireless network at a site. The network data is indicative of one or more aspects of wireless network performance. The NMS may determine a network event associated with the network data. For example, the NMS can determine that the network data indicates a degradation in performance metrics, and, based on the network data, can determine a root cause for the degradation. Additionally, the NMS can automatically determine appropriate network management actions to respond to the network event. For example, in the case where the network event is a degradation in SLE metrics, the network management action may be to perform one or more mitigation actions, or suggest mitigation actions, to remedy the degradation in SLE metrics. In some cases, a degradation in SLE metrics may be expected or unavoidable, and in such cases, no mitigation actions are necessary. As an example, client devices associated with an access point that is near an entrance/exit of a site are expected to experience degraded SLE metrics as users of the client devices exit the site. Similarly, client devices associated with an access point that is near an elevator may be expected to experience a degradation in SLE metrics as users of the client devices enter the elevator. APs that are located in areas where degradation of SLE metrics may be expected due to users leaving the area may be referred to as "edge APs" as they are typically at an edge of graph representing paths through a wireless network. Such APs may also be referred to as "transition APs" as a reflection of the fact that client devices often transition in and out of a wireless network at such an AP.

In some aspects, an NMS may utilize the techniques disclosed herein to, in response to a network event, determine a classification of an AP, and to determine a network management action based on the classification of the AP. For example, a network event can be a degradation in SLE metrics experienced by one or more clients. In the case that the NMS indicates that there is a high probability that the root cause of degradation in SLE metrics is due to a fault in an identified AP, the NMS can determine if the identified AP is classified as an edge AP. If the identified AP is classified as an edge AP, the NMS can bypass actions to mitigate the fault. If the identified AP is not an edge AP, the NMS can initiate action to mitigate the fault in the identified AP. In some cases, the action to mitigate the fault in the identified AP may involve restarting or resetting the AP. This can make the AP unusable for the time it takes to complete the restart or reset. It is thus desirable to avoid mitigation actions that are unnecessary.

In one example, this disclosure describes a system that includes a plurality of access point (AP) devices configured to provide a wireless network at a site; and a network management system includes a memory storing network data received from the plurality of AP devices, the network data collected by the plurality of AP devices or a plurality of client devices associated with the wireless network, and one or more processors coupled to the memory and configured to: receive a time series of SLE metrics, the SLE metrics based on the network data, determine, based on the time series of the SLE metrics, whether a network event has occurred, in response to a determination that a network event has occurred, determine a root cause for the network event, and in response to a determination that the root cause of the network event is associated with an AP device of the plurality of AP devices, determine a classification of the AP device, and determine a network management action for the AP device based on the network event and the classification of the AP device.

In another example, this disclosure describes a network management system (NMS) that manages a plurality of access point (AP) devices in a wireless network includes a memory storing network data received from the plurality of AP devices, the network data collected by the plurality of AP devices or a plurality of client devices associated with the wireless network; and one or more processors coupled to the memory and configured to: receive a time series of SLE metrics determined from the network data, determine, based on the time series of the SLE metrics, whether a network event has, in response to a determination that a network event has occurred, determine a root cause for the network event, and in response to a determination that the root cause of the network event is associated with an AP device of the plurality of AP devices, determine a classification of the AP device, and determine a network management action for the AP device based on the network event and the classification of the AP device.

In another example, this disclosure describes a method that includes receiving, from a plurality of AP devices, network data collected by the plurality of AP devices of a wireless network or a plurality of client devices associated with the wireless network; determining a time series of SLE metrics associated based on the network data; determining, based on the time series of the SLE metrics, whether a network event has occurred; in response to determining that a network event has occurred, determining a root cause for the network event, and in response to determining that the root cause of the network event is associated with an AP device of the plurality of AP devices, determining a classification of the AP device, and determining a network management action for the AP device based on the network event and the classification of the AP device.

The details of one or more examples are set forth in the accompanying drawings and the description below. Other features, objects, and advantages will be apparent from the description and drawings, and from the claims.

DETAILED DESCRIPTION

Figure 1:
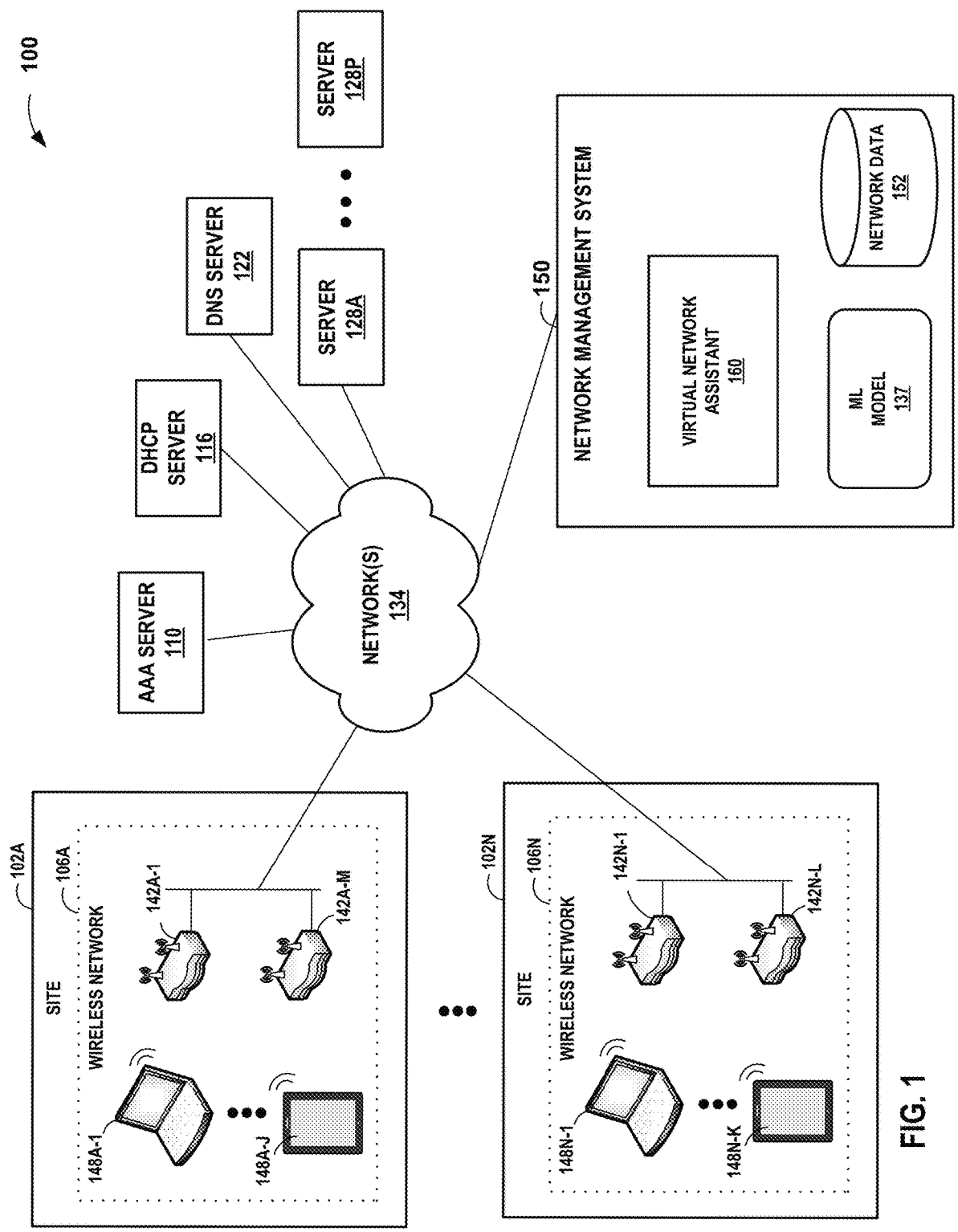
FIG. 1 is a block diagram of an example network system in which a network management system is configured to classify access points and perform network management actions based on the classification of the access point, in accordance with one or more techniques of the disclosure.

Commercial premises, such as offices, hospitals, airports, stadiums, or retail outlets, often install complex wireless network systems, including a network of wireless access points (APs), throughout the premises to provide wireless network services to one or more wireless client devices. The client devices may include, for example, smart phones or other mobile computing devices, display devices, Internet of Things (IoT) devices, etc. In cases where there are multiple APs at a site that are available to a client device, the client device may associate with the AP that can provide the best (e.g., strongest) signal.

A wireless network service provider may collect network data to monitor wireless network behavior and measure one or more aspects of wireless network performance at a site. The network data may be collected from, for example, one or more of the client devices and/or one or more of APs associated with the wireless network. One or more service level expectation (SLE) metrics determined based on the collected network data can be used to measure various aspects of wireless network performance. SLE metrics seek to measure and understand network performance from the viewpoint of the end user experience on the network. One example SLE metric is a coverage metric, which periodically (e.g., every 5 seconds) measures the signal strength indicator corresponding to the power received by a client from the AP with which the client is associated. Another example SLE metric is a roaming metric, which tracks a client device's percentage of successful roams between two access points. Other example SLE metrics may include time to connect, throughput, successful connects, capacity, AP health, and/or any other metric that may be indicative of one or more aspects of wireless network performance. The SLE metrics may also include parameters such as a received signal strength indicator (RSSI) as measured by the client device, the signal-to-noise ratio (SNR) of the wireless signal as measured by the client device, etc. A network service provider may customize and configure various thresholds for the SLE metrics to define service level expectations at the site. A network management system can generate a network event in response to one or more of the thresholds being crossed. In response to the network event, the network management system may determine a root cause of the network event. For example, in the case that the network event comprises an error in the operation or configuration of the wireless network, the network management system may automatically identify the root cause(s) of any SLE metrics that do not satisfy the thresholds, and may automatically implement one or more network management actions to address the root cause and thus improve the performance wireless network performance.

The network management actions may be based on a classification of a network device such as an AP. Degradation of SLE metrics may be indicative of an error or fault in the configuration or operation of a network device or devices, and mitigation actions are typically performed in such cases to resolve the error or fault. However, in certain situations, the degradation of SLE metrics may be expected and safely ignored for certain classes of APs. For example, as noted above, degradation in SLE metrics can be expected when a user exits a site, enters an elevator, or make some other transition away from an AP without associating with a different AP at a site. However, current systems typically cannot recognize cases where degradation in SLE metrics is to be expected and ignored. As a result, a network management system may erroneously indicate that there is some fault in the AP that needs to be resolved, when in fact, the AP may be operating normally. An erroneous identification of an AP as being faulty can result in unnecessary costs to a network service provider. For example, resources may be wasted performing automated testing and resetting of the AP. Further, sending a technician to diagnose the AP when in fact there is no problem with the AP is a waste of time and resources. Further, customers may be inconvenienced by the downtime while the AP is being diagnosed and reset.

In accordance with one or more techniques of the disclosure, a network management system can determine that a network event has occurred, such as degradation in SLE metrics. In some aspects, a network management system can determine a classification for an AP. For example, the network management system may determine whether or not the AP is classified as an edge AP (also referred to as a "transition AP"). The network management system may classify the AP as an edge AP in response to indicators that the AP is on the periphery of an AP neighborhood graph representing paths through a wireless network, or other indicators that the AP is located near a location where client devices transition on and off a wireless network provided by a wireless service provider. Examples of such locations are entrances/exits of buildings, elevators, stairs, APs next to a parking lot, etc. The NMS can determine if the AP is classified as an edge AP. The network management system can determine a network management action based on the root cause of the network event and the classification of the AP. For example, if the AP is classified as an edge AP, the NMS can bypass any remediation actions for the AP. If the AP is not an edge AP, the NMS can perform mitigation actions for the AP directed at improving or restoring the operation of the AP, which in turn can improve SLE metrics.

FIG. 1 is a block diagram of an example network system in which a network management system (NMS) is configured to classify network devices and control the mitigation action based on the classification of a device that has been identified as a root causes of degraded network performance, in accordance with one or more techniques of the disclosure. Example network system 100 includes a plurality sites 102A-102N at which a network service provider manages one or more wireless networks 106A-106N, respectively. Although in FIG. 1 each site 102A-102N is shown as including a single wireless network 106A-106N, respectively, in some examples, each site 102A-102N may include multiple wireless networks, and the disclosure is not limited in this respect.

Each site 102A-102N includes a plurality of access points (APs), referred to generally as APs 142. For example, site 102A includes a plurality of APs 142A-1 through 142A-M. Similarly, site 102N includes a plurality of APs 142N-1 through 142N-L. Each AP 142 may be any type of wireless access point, including, but not limited to, a commercial or enterprise AP, a router, or any other device capable of providing wireless network access.

Each site 102A-102N also includes a plurality of client devices, otherwise known as user equipment devices (UEs), referred to generally as UEs 148, representing various wireless-enabled devices within each site. For example, a plurality of UEs 148A-1 through 148A-J are currently located at site 102A. Similarly, a plurality of UEs 148N-1 through 148N-K are currently located at site 102N. Each UE 148 may be any type of wireless client device, including, but not limited to, a mobile device such as a smart phone, tablet or laptop computer, a personal digital assistant (PDA), a wireless terminal, a smart watch, smart ring or other wearable device. UEs 148 may also include IoT client devices such as printers, security devices, environmental sensors, or any other device configured to communicate over one or more wireless networks.

Example network system 100 also includes various networking components for providing networking services within the wired network including, as examples, an Authentication, Authorization and Accounting (AAA) server 110 for authenticating users and/or UEs 148, a Dynamic Host Configuration Protocol (DHCP) server 116 for dynamically assigning network addresses (e.g., IP addresses) to UEs 148 upon authentication, a Domain Name System (DNS) server 122 for resolving domain names into network addresses, a plurality of servers 128 (e.g., web servers, databases servers, file servers and the like), and a network management system (NMS) 150.

As shown in FIG. 1, the various devices and systems of network 100 are coupled together via one or more network(s) 134, e.g., the Internet and/or an enterprise intranet. Each one of the servers 110, 116, 122, and/or 128, APs 142, UEs 148, NMS 150, and any other servers or devices attached to or forming part of network system 100 may include a system log or an error log module wherein each one of these devices records the status of the device including normal operational status and error conditions.

In the example of FIG. 1, NMS 150 is a cloud-based computing platform that manages wireless networks 106A-106N at one or more of sites 102A-102N. As further described herein, NMS 150 provides an integrated suite of management tools and implements various techniques of the disclosure.

In accordance with the techniques described herein, NMS 150 monitors network data associated with wireless networks 106A-106N at each site 102A-102N, respectively, and manages network resources, such as APs 142 at each site, to deliver a high-quality wireless experience to end users, IoT devices and clients at the site. The network data may be stored in a database associated with NMS 150, such as database 152. In general, NMS 150 may provide a cloud-based platform for network data acquisition, monitoring, activity logging, reporting, predictive analytics, network anomaly identification, invoking remedial actions, and alert generation.

For example, NMS 150 may include a virtual network assistant (VNA) 160 that analyzes network data received from one or more UEs 148 and/or one or more APs 142 in a wireless network, provides real-time insights and simplified troubleshooting for IT operations, and automatically takes corrective action or provides recommendations to proactively address wireless network issues. VNA 160 may, for example, include a network data processing platform configured to process a very large number, e.g., hundreds or thousands, of concurrent streams of network data from sensors and/or agents associated with APs 142 and/or nodes within, or attached to, network 134. For example, VNA 160 of NMS 150 may include a network performance engine that automatically determines one or more SLE metrics for each client device 148 in a wireless network 106. VNA 160 may also include an underlying analytics and network error identification engine and alerting system. VNA 160 may further provide real-time alerting and reporting to notify administrators of any predicted events, anomalies, trends, and may perform root cause analysis and automated or assisted error remediation.

In some examples, VNA 160 of NMS 150 may apply machine learning techniques to identify the root cause of error conditions or poor wireless network performance metrics detected or predicted from the streams of event data. For example, in some aspects, VNA 160 may utilize a machine learning model 137 that has been trained using either supervised or unsupervised machine learning techniques to identify the root cause of error conditions or poor network performance based on network data. VNA 160 may generate a notification indicative of the root cause and/or invoke one or more corrective or remedial network management actions that may be taken to address the root cause of the error conditions or poor wireless network performance metrics. The network management action may include mitigation actions if the root cause may be automatically resolved. For example, VNA 160 can invoke one or more corrective actions to correct the root cause of the error condition or poor wireless network performance metrics, thus automatically improving the underlying wireless network performance metrics (e.g., one or more SLE metrics) and also automatically improving the user experience.

As an example, VNA 160 may determine that a fault or error in the operation of a network device such as an AP may be the root cause of the error conditions or poor wireless performance. Additionally, VNA 160 may implement one or more of the techniques described herein to determine a classification for the AP. VNA 160 may determine a network management action based on the root cause and the classification of the AP. If VNA 160 determines, based on the classification, that the root cause can be ignored, then the network management action may be to bypass mitigation actions.

Example details of these and other operations implemented by the VNA 160 and/or NMS 150 are described in U.S. application Ser. No. 14/788,489, filed Jun. 30, 2015, and entitled "Monitoring Wireless Access Point Events," U.S. application Ser. No. 16/835,757, filed Mar. 31, 2020, and entitled "Network System Fault Resolution Using a Machine Learning Model," U.S. application Ser. No. 16/279,243, filed Feb. 19, 2019, and entitled "Systems and Methods for a Virtual Network Assistant," U.S. application Ser. No. 16/237,677, filed Dec. 31, 2018, and entitled "Methods and Apparatus for Facilitating Fault Detection and/or Predictive Fault Detection," U.S. application Ser. No. 16/251,942, filed Jan. 18, 2019, and entitled "Method for Spatio-Temporal Modeling," U.S. application Ser. No. 16/296,902, filed Mar. 8, 2019, and entitled "Method for Conveying AP Error Codes Over BLE Advertisements," and U.S. application Ser. No. 17/303,222, filed May 24, 2021, and entitled, "Virtual Network Assistant Having Proactive Analytics and Correlation Engine Using Unsupervised ML Model," all of which are incorporated herein by reference in their entirety.

In operation, NMS 150 observes, collects and/or receives network data 152. The network data is indicative of one or more aspects of wireless network performance. Network data 152 may take the form of data extracted from messages, counters and statistics, for example. The network data may be collected and/or measured by one or more UEs 148 and/or one or more APs 142 in a wireless network 106. Some of the network data may be collected and/or measured by other devices in the network system 100. In accordance with one specific implementation, a processor or computing device is part of the network management server 150. In accordance with other implementations, NMS 150 may comprise one or more processors, processing circuitry, computing devices, dedicated servers, virtual machines, containers, services or other forms of environments for performing the techniques described herein. Similarly, computational resources and components implementing VNA 160 may be part of the NMS 150, may execute on other servers or execution environments, or may be distributed to nodes within network 134 (e.g., routers, switches, controllers, gateways and the like).

NMS 150 receives network data associated with a plurality of client devices, such as UEs 148, in a wireless network, such as any of wireless network(s) 106A-106N. The network data is indicative of one or more aspects of wireless network performance. The network data may be received as time series data that is monitored at one or more periodic intervals. The network data may be measured or collected by, for example, one or more UEs 148 and/or one or more APs 142 associated with the wireless network 106. Based on the received network data, VNA 160 of NMS 150 determines one or more SLE metrics associated with each of the plurality of UEs 148 associated with the wireless network 106.

The techniques of the disclosure provide one or more technical advantages and practical applications. For example, the techniques enable the NMS to determine network management actions that may be directed to particular classifications of APs or other network devices. For example, an NMS can automatically detect degradation in SLE metrics and automatically avoid performance of mitigation actions when the degradation in SLE metrics are to be expected, for example, when the degradation in SLE metrics is associated with an AP classified as an edge AP. Such degradation can be expected as part of the normal operations of the AP as client devices transition in and out of the wireless network. Avoiding or bypassing mitigation actions can be advantageous in this case because it can avoid unnecessary resource costs and customer inconvenience, such as e.g., experiencing SLE deterioration, associated with performing the unnecessary mitigation actions. As an example, resetting an AP to mitigate a fault can result in a temporary loss of network connectivity to client devices associated with the AP. Further, the temporary loss of connectivity may result in client devices associating with other APs at the site, which can cause an overloading of the other APs. The loss of network connectivity can result in user dissatisfaction. Further, compute and network resources can be wasted when APs are reset unnecessarily. The techniques described herein can avoid unnecessary mitigation actions, thereby preventing wasteful use of resources and more efficient network operation.

Although the techniques of the present disclosure are described in this example as performed by NMS 150, it shall be understood that techniques described herein may be performed by any other computing device(s), system(s), and/or server(s), and that the disclosure is not limited in this respect. For example, one or more computing device(s) configured to execute the functionality of the techniques of the disclosure may reside in a dedicated server or be included in any other server (such as any of servers 128A-128N) in addition to or other than NMS 150, or may be distributed throughout network 100, and may or may not form a part of NMS 150.

In addition or alternatively, in some examples, network nodes (e.g., routers or switches within network 134) and/or access points 142 may be configured to locally construct, train, apply and retrain unsupervised ML model(s) 137 based on locally collected SLE metrics to determine whether the collected network event data should be discarded or whether the data represents anomalous behavior that needs to be forwarded to NMS 150 for further root cause analysis of VNA 350 (FIG. 3) to facilitate identification and resolution of faults.

Figure 2:
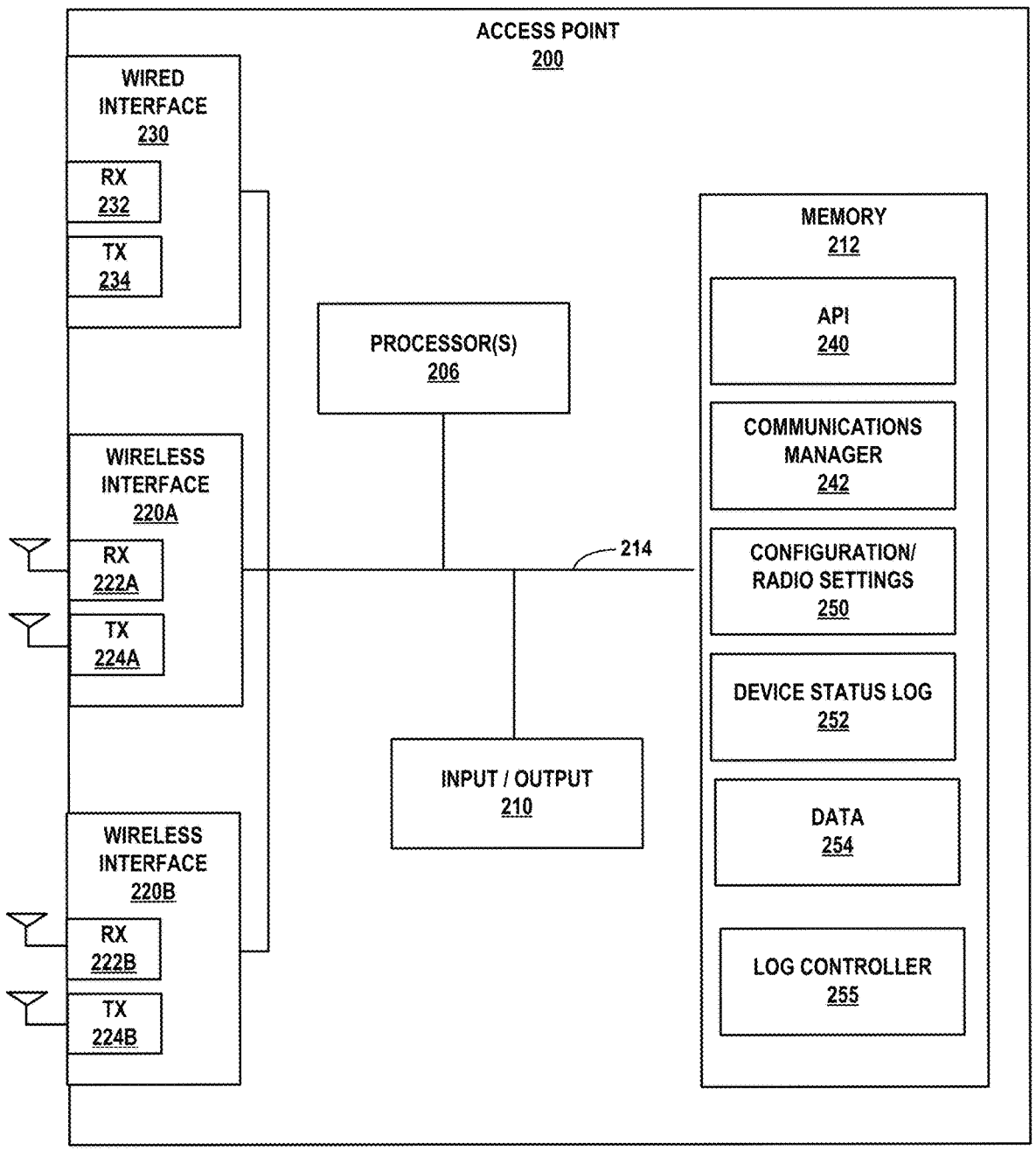
FIG. 2 is a block diagram of an example access point device, in accordance with one or more techniques of the disclosure.

FIG. 2 is a block diagram of an example access point (AP) device 200 configured in accordance with one or more techniques of the disclosure. Example access point 200 shown in FIG. 2 may be used to implement any of APs 142 as shown and described herein with respect to FIG. 1. Access point 200 may comprise, for example, a Wi-Fi, Bluetooth and/or Bluetooth Low Energy (BLE) base station or any other type of wireless access point.

In the example of FIG. 2, access point 200 includes a wired interface 230, wireless interfaces 220A-220B, one or more processor(s) 206, memory 212, and a user interface 210, coupled together via a bus 214 over which the various elements may exchange data and information. Wired interface 230 represents a physical network interface and includes a receiver 232 and a transmitter 234 for sending and receiving network communications, e.g., packets. Wired interface 230 couples, either directly or indirectly, access point 200 to network(s) 134 of FIG. 1. First and second wireless interfaces 220A and 220B represent wireless network interfaces and include receivers 222A and 222B, respectively, each including a receive antenna via which access point 200 may receive wireless signals from wireless communications devices, such as UEs 148 of FIG. 1. First and second wireless interfaces 220A and 220B further include transmitters 224A and 224B, respectively, each including transmit antennas via which access point 200 may transmit wireless signals to wireless communications devices, such as UEs 148 of FIG. 1. In some examples, first wireless interface 220A may include a Wi-Fi 802.11 interface (e.g., 2.4 GHz and/or 5 GHz) and second wireless interface 220B may include a Bluetooth interface and/or a Bluetooth Low Energy (BLE) interface. However, these are given for example purposes only, and the disclosure is not limited in this respect.

Processor(s) 206 are programmable hardware-based processors configured to execute software instructions, such as those used to define a software or computer program, stored to a computer-readable storage medium (such as memory 212), such as non-transitory computer-readable mediums including a storage device (e.g., a disk drive, or an optical drive) or a memory (such as Flash memory or RAM) or any other type of volatile or non-volatile memory, that stores instructions to cause the one or more processors 206 to perform one or more of the techniques described herein.

Memory 212 includes one or more devices configured to store programming modules and/or data associated with operation of access point 200. For example, memory 212 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 206 to perform one or more of the techniques described herein.

In this example, memory 212 stores executable software including an application programming interface (API) 240, a communications manager 242, configuration settings 250, a device status log 252 and data storage 254. Device status log 252 includes a list of network parameters and/or network events specific to access point 200. The network parameters may include, for example, any network parameter indicative of one or more aspects of performance of the wireless network. In some examples, network parameters may include a plurality of states measured periodically as time series data that can be translated into one or more SLE metrics. The network parameters may be measured by the UE devices 148, the APs 142/300 or another device associated with the wireless network.

Network events may include, for example, access point events and/or UE events. The access point events and/or UE events may each include a log of normal network events, neutral network events, and/or error network events. The network events may include, for example, memory status, reboot events, crash events, Ethernet port status, upgrade failure events, firmware upgrade events, configuration changes, authentication events, DNS events, DHCP events, roaming events, etc., as well as a time and date stamp for each event. Log controller 255 determines a logging level for the device based on instructions from NMS 150. Data 254 may store any data used and/or generated by access point 200, including data collected from UEs 148, such as data used to calculate one or more SLE metrics, that is transmitted by access point 200 for cloud-based management of wireless networks 106A by NMS 150.

Communications manager 242 includes program code that, when executed by processor(s) 206, allow access point 200 to communicate with UEs 148, other APs 142, and/or network(s) 134 via any of interface(s) 230 and/or 220A-220B. Configuration settings 250 include any device settings for access point 200 such as radio settings for each of wireless interface(s) 220A-220B. These settings may be configured manually or may be remotely monitored and managed by NMS 150 to optimize wireless network performance in real-time, or on a periodic (e.g., hourly or daily) basis.

Input/output (I/O) 210 represents physical hardware components that enable interaction with a user, such as buttons, a touchscreen, a display and the like. Although not shown, memory 212 typically stores executable software for controlling a user interface with respect to input received via I/O 210.

As described herein, AP device 200 may measure and report network data (i.e., network parameters and/or network event data) from status log 252 to NMS 150. The network data is indicative of one or more aspects of wireless network performance and/or status of the wireless network. The network data may be measured and/or determined by one or more of the UE devices and/or by one or more of the APs 200 in a wireless network. AP device 200 can provide the network data to NMS 150 for use in the techniques described herein.

Figure 3:
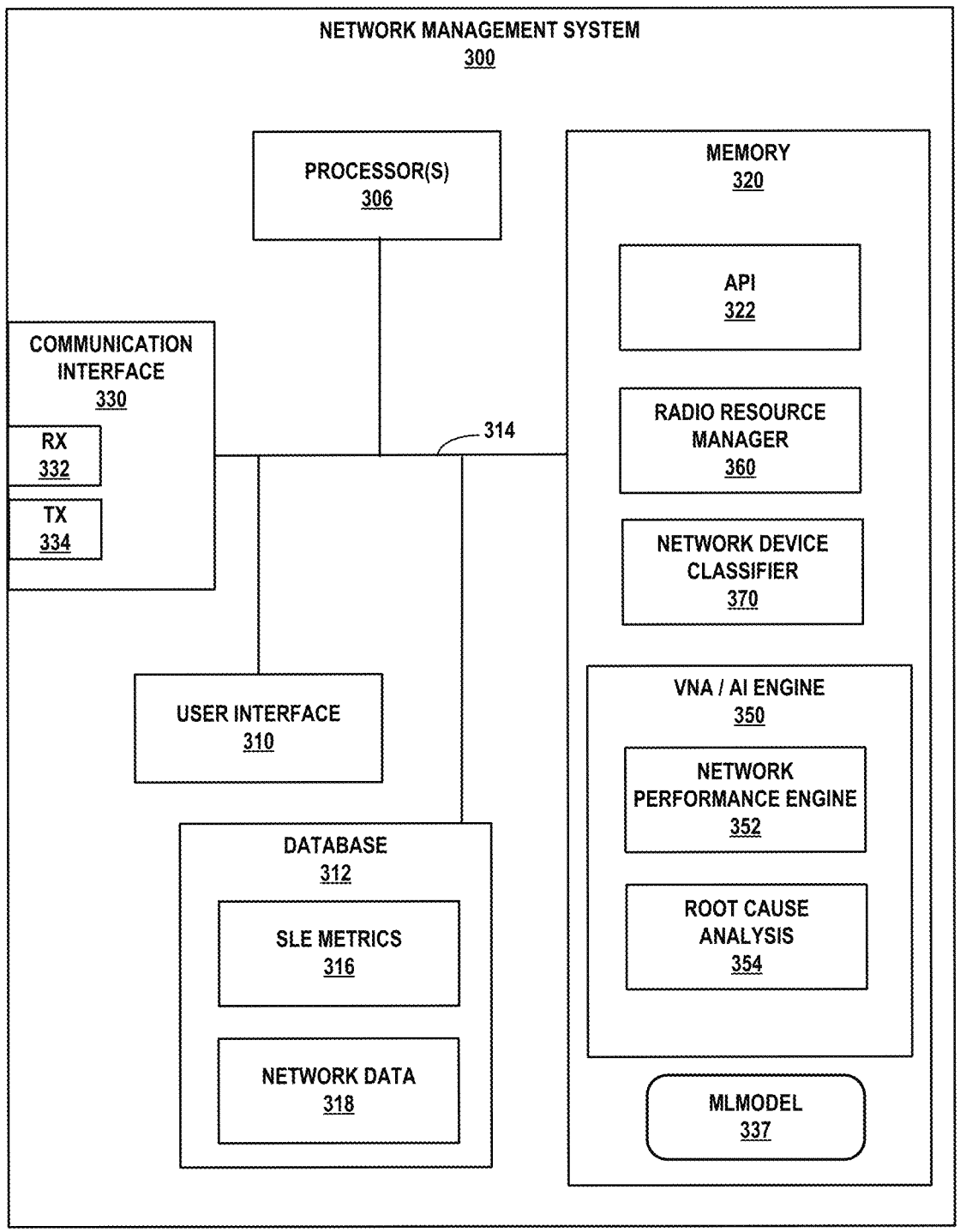
FIG. 3 is a block diagram of an example network management system configured to classify access points and perform network management actions based on the classification of the access point, in accordance with one or more techniques of the disclosure.

FIG. 3 is a block diagram of an example network management system configured to classify access points and perform network management actions based on the classification of the access point. In some aspects, an NMS can utilize SLE parameters from mobile devices to identify root causes of degraded network performance. The network management system can determine whether an access point that is perceived as a root cause device of a fault or error condition is an edge device and based on that can determine whether or not to invoke a remedial action. NMS 300 may be used to implement, for example, NMS 150 in FIG. 1. In such examples, NMS 300 is responsible for monitoring and management of one or more wireless networks 106A-106N at sites 102A-102N, respectively. In some examples, NMS 300 receives network data collected by APs 200 from UEs 148, such as network data used to calculate one or more SLE metrics, and analyzes this data for cloud-based management of wireless networks 106A-106N. In some examples, NMS 300 may be part of another server shown in FIG. 1 or a part of any other server.

NMS 300 includes a communications interface 330, one or more processor(s) 306, a user interface 310, a memory 320, and a database 312. The various elements are coupled together via a bus 314 over which the various elements may exchange data and information.

Processor(s) 306 execute software instructions, such as those used to define a software or computer program, stored to a computer-readable storage medium (such as memory 320), such as non-transitory computer-readable mediums including a storage device (e.g., a disk drive, or an optical drive) or a memory (such as Flash memory or RAM) or any other type of volatile or non-volatile memory, that stores instructions to cause the one or more processors 306 to perform the techniques described herein.

Communications interface 330 may include, for example, an Ethernet interface. Communications interface 330 couples NMS 300 to a network and/or the Internet, such as any of network(s) 134 as shown in FIG. 1, and/or any local area networks. Communications interface 330 includes a receiver 332 and a transmitter 334 by which NMS 300 receives/transmits data and information to/from any of APs 142, servers 110, 116, 122, 128, and/or any other devices or systems forming part of network 100 such as shown in FIG. 1. The data and information received by NMS 300 may include, for example, network data and/or event log data received from APs 142 used by NMS 300 to remotely monitor and/or control the performance of wireless networks 106A-106N. NMS may further transmit data via communications interface 330 to any of network devices such as APs 142 at any of network sites 102A-102N to remotely manage wireless networks 106A-106N.

Memory 320 includes one or more devices configured to store programming modules and/or data associated with operation of NMS 300. For example, memory 320 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 306 to perform the techniques described herein.

In this example, memory 320 includes an API 322, a virtual network assistant (VNA)/AI engine 350, a radio resource management (RRM) engine 360, and a network device classifier 370. VNA/AI engine 350 includes a network performance engine 352 and a root cause analysis engine 354. NMS 300 may also include any other programmed modules, software engines and/or interfaces configured for remote monitoring and management of wireless networks 106A-106N, including remote monitoring and management of any of APs 142/200.

Network performance engine 352 enables set up and tracking of thresholds for SLE metrics for each of wireless networks 106A-106N. Network performance engine 352 further analyzes network data collected by APs and or UEs associated with wireless networks 106A-106N, such as any of APs 142 from UEs 148 in each wireless network 106A-106N. For example, APs 142A-1 through 142A-M collect network data from UEs 148A-1 through 148A-J currently associated with wireless network 106A. This data, in addition to any network data collected by one or more APs 142A-1 through 142A-M in wireless network 106A, is transmitted to NMS 300, which executes network performance engine 352 to determine one or more SLE metrics for each UE 148A-1 through 148A-J associated with wireless network 106A. One or more of the SLE metrics may further be aggregated to each AP at a site to gain insight into each APs contribution to wireless network performance at the site. The SLE metrics track whether the service level meets the configured threshold values for each SLE metric. If a metric does not meet the configured SLE threshold value for the site, the failure or degradation may be attributed to one of the classifiers to further understand how and/or why the failure or degradation occurred.

Example SLE metrics are shown in below in Table 1.

TABLE 1

| | |
|---|---|
| Time to Connect | The number of connections that took longer than a specified threshold to connect to the internet. |
| Throughput | The amount of time, that a client's estimated throughput is below a specified threshold. |
| Coverage | The number of user minutes that a client's RSSI as measured by the access point is below a specified threshold. |
| Capacity | The number of user minutes that a client experiences "poor" capacity. |
| Roaming | The percentage of successful roams between 2 access points for clients that are within a specified target time that it takes for a client to roam. |
| Successful Connects | The percentage of successful Authorization, Association, DHCP, ARP, and DNS attempts during an initial connection by a client to the network, when a client roams from one AP to the next, and on an on-going basis. |
| AP Health | This may be calculated based on AP Reboots, AP Unreachable events, and Site Down events. |

RRM engine 360 monitors one or more metrics for each site 106A-106N in order to learn and optimize the RF environment at each site. For example, RRM engine 360 may monitor the coverage and capacity SLE metrics for a wireless network 106 at a site 102 in order to identify potential issues with coverage and/or capacity in the wireless network 106 and to make adjustments to the radio settings of the access points at each site to address the identified issues. For example, RRM engine 360 may determine channel and transmit power distribution across all APs 142 in each network 106A-106N. For example, RRM engine 360 may monitor events, power, channel, bandwidth, and number of clients connected to each AP. RRM engine 360 may further automatically change or update configurations of one or more APs 142 at a site 106 with an aim to improve the coverage and capacity SLE metrics and thus to provide an improved wireless experience for the user.

NMS 300 includes network device classifier 370 that can determine a classification for a network device. Network device classifier 370 can apply various heuristics to data from various sources to determine a classification for a network device. As an example, network device classifier 370 can utilize network data received from network devices on wireless networks 106A-106N, data from servers 110, 116, 122, and 128A-128P (FIG. 1) among other sources to determine a classification for a network device. Various aspects of network device classifier 370 are discussed below with reference to an example site illustrated in FIG. 4.

Figure 4:
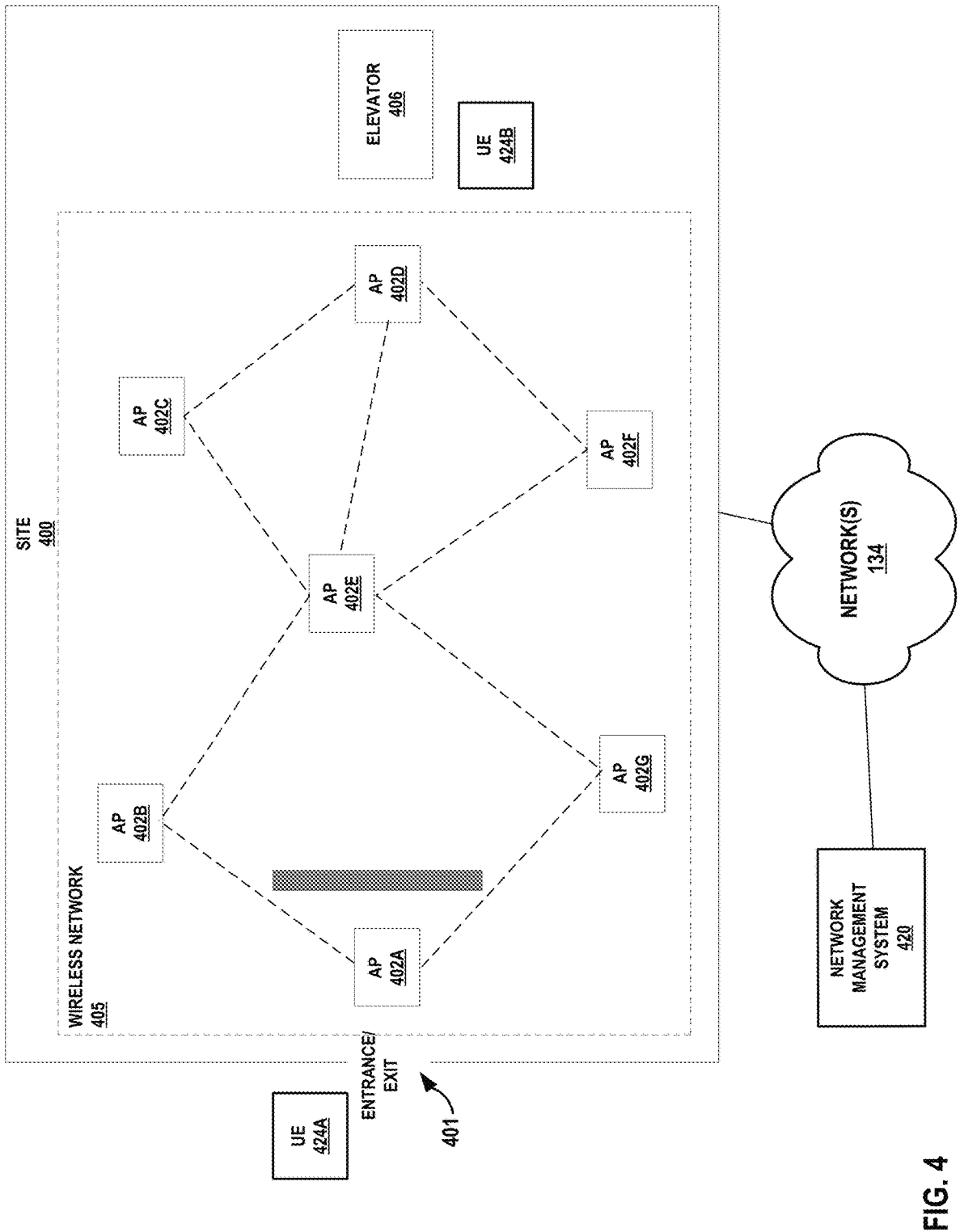
FIG. 4 is a conceptual diagram illustrating an example arrangement of access points at a site, in accordance with one or more techniques of the disclosure.

FIG. 4 is a conceptual diagram illustrating an example arrangement of access points at a site, in accordance with one or more techniques of the disclosure. In this example, a site 400 includes APs 402A-402G (referred to generically as "AP 402"). Site 400 may be a floor of a building and APs 402A-402G may be, for example, APs arranged on within site 400. Dashed lines between the APs 402A-402G indicate that the APs can communicate with one another, or alternatively, receive a radio signal from a neighboring AP with an RSSI greater than a predetermined threshold. In this example, AP 402A is located near an entrance 401 to site 400, and AP 402D is located near an elevator 406 of site 400. UE 424A and UE 424B may be UEs of a customer, employee, or other person at site 400 or entering/exiting site 400. Also shown in FIG. 4 is network management system 420, which network management system may be network management system 150 (FIG. 1) or network management system 300 (FIG. 3).

Returning to FIG. 3, network device classifier 370 may determine a classification for an AP 402. In some aspects, network classifier 370 may determine a classification of an AP according to a betweenness centrality value for the AP. Betweenness centrality is a measure centrality of a node in a graph based on shortest paths between nodes. Network classifier 370 can construct a graph of the nodes, where an edge between nodes indicates a communication connection between the nodes. In some aspects, nodes in the graph can represent APs, and edges can indicate that an AP can receive a radio signal from a neighboring AP with an RSSI greater than a predetermined threshold. For every pair of nodes in the graph, network classifier 370 can determine a shortest path between the nodes that minimizes the number of edges that the path passes through. The betweenness centrality value for a node is the number of shortest paths that pass through the node. In some aspects, the edges can be weighted based on capacity, cost, etc. In this case, the network device classifier 370 can determine the shortest path as the path that minimizes the sum of the weights of the paths. Further details on determination of betweenness centrality can be found in Freeman, Linton. 1977. "A set of measures of centrality based on betweenness." *Sociometry*. Vol. 40, No. 1, which is hereby incorporated by reference herein.

Using the betweenness centrality algorithm, all of the APs in FIG. 4 other than AP 402E may be identified as edge devices. While UEs associated with AP 402A and AP 402D may experience SLE deterioration as a user leaves the site 400 or enters the elevator 406, UEs associated with the other edge APs may be actually outside of the enterprise building e.g., in a parking lot, and as such may experience SLE deterioration as the user of the UE drives away from the site 400.

Figure 5:
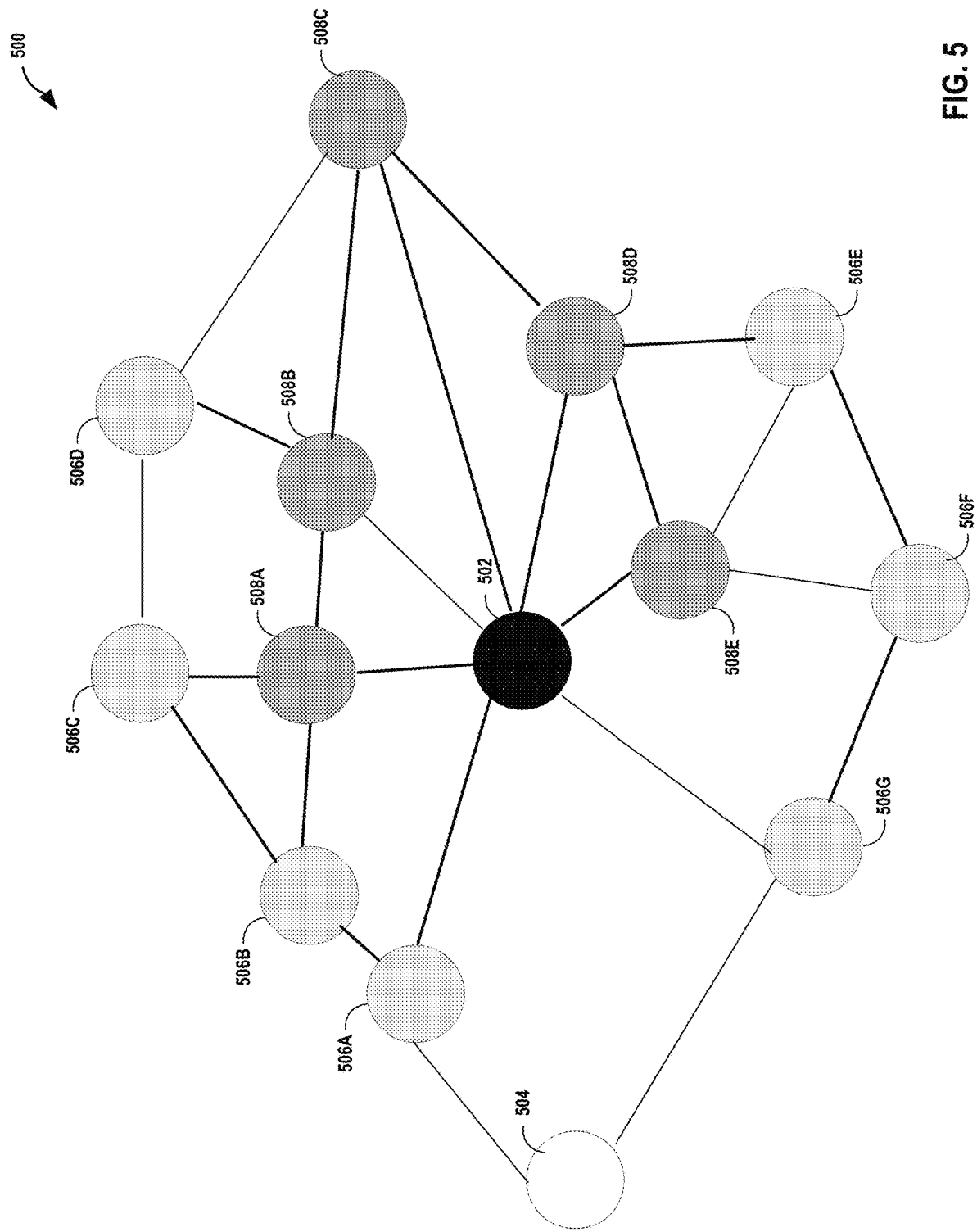
FIG. 5 is a conceptual diagram illustrating an example graph representing network device connectivity, in accordance with one or more aspects of the disclosure.

FIG. 5 is a conceptual diagram illustrating an example graph 500 representing network devices and their neighbors, in accordance with one or more aspects of the disclosure. Two APs can be considered to be neighbors if a first AP receives the radio signal from a second AP at a power level greater than a predetermined threshold. In some aspects, the power level may be indicated by an RSSI value. Circles in the graph are nodes that represent network devices such as APs in an example network, and edges between the circles indicate that one AP receives a radio signal from a neighboring AP with an RSSI greater than a predetermined threshold. The nodes have been shaded according to the number of shortest paths passing through the node, where a darker shade indicates a greater number of shortest paths passes through the node than nodes that have a lighter shade. In this example, node 502 has the greatest number of shortest paths passing through the node. Thus, node 502 may be classified as a "central" node. Node 504 has the fewest shortest paths passing through the node and may be classified as an edge node. Nodes 506A-506G also have relatively few shortest paths passing through them. Thus, nodes 506A-506G may also be classified as "edge" nodes. Nodes that are not a central node or an edge node (e.g., nodes 508A-508E) may be classified as an "interior" node. As will be discussed in further detail below, a node that is not classified as an edge node according to a betweenness centrality value may be classified as an edge node using other heuristics. For example, any of nodes 508A-508E that are classified as interior nodes according to betweenness centrality may be classified as an edge node based on other heuristics.

Returning to FIG. 3 and using the example site 400 of FIG. 4, network device classifier 370 may construct a graph indicating the neighborhood connections between APs 402A-402G. In this example, nodes 402A and 402D may have the fewest shortest paths through the AP. Network device classifier 370 may thus classify APs 402A and 402D as edge APs. In accordance with another example implementation all of the APs other than AP 402E may be identified as edge APs since users from outside the enterprise structure, e.g., users from a parking lot adjacent to or near site 400, may use the wireless network 405 and experience an expected SLE deterioration as they move/drive away from the site 400.

In some aspects, network device classifier 370 may use various heuristics to classify a device as an edge device. In accordance with one example implementation network device classifier may use bandwidth metrics to classify an AP 402 as an edge AP. For instance, bandwidth of an AP that is close to an entrance of a site is typically used less than bandwidth of an interior AP. As an example, a site 400 may have offices and conferences rooms that are serviced by interior APs, while a reception area at an entrance to the site may be serviced by an edge AP. Client devices in offices or conference rooms are more likely to be involved in applications that have higher data volumes than applications that may be used by client devices in the reception area. Additionally, client devices in a reception area are more likely to transition to an interior AP as the user moves from place to place at the site. Network device classifier 370 may analyze bandwidth usage of UEs associated with an AP 402 and classify, as an edge AP, an AP 402 where UE bandwidth usage is below a threshold value.

Similarly, in some aspects, network device classifier 370 may use connection time metrics to classify an AP 402 as an edge AP. It is typically the case that connection times of an edge AP are less than that of other APs. For instance, connection times of an AP that is close to an entrance of a site is typically less than connection times of interior APs. As with the example above, a site 400 may have offices and conferences rooms that are serviced by interior APs, while a reception area at an entrance to the site may be serviced by an edge AP. Client devices in offices or conference rooms are more likely to remain connected to an AP than a client device in a reception area. Client devices in a reception area are more likely to transition from the edge AP to an interior AP as the user moves from place to place at the site. Network device classifier 370 may analyze connection time metrics and classify an AP 402 where connection times are below a threshold time as an edge AP.

In some aspects, network device classifier 370 may determine a classification for an AP according to a count of the number of times an AP 402 is the first AP in a wireless network to associate with client devices. Again using the example site 400 illustrated in FIG. 4, users can enter site 400 via entrance/exit 401. Because AP 402A is the nearest AP to entrance/exit 401, it is likely that AP 402A will be the first AP of wireless network 405 that a UE 424A carried by a user entering site 400 will associate with. Similarly, in the example illustrated in FIG. 4, AP 402D is the nearest AP to elevator 406. Because AP 402D is the nearest to elevator 406, it is likely that AP 402D will be the first AP of wireless network 405 that a UE 424B carried by a user exiting the elevator will associate with. Network device classifier 370 (or other module of network management system 420) can maintain a count of the number of times an AP 402 is the first AP a client device associates with. This association will be referred to as a "first association."

Network device classifier 370 can use the first association value to determine if an AP 402 should be classified as an edge AP. As an example, network device 370 may determine a ratio of the number of first associations for an AP to the total number of associations for the AP 402. If the ratio is above a threshold percentage, network device classifier can classify the AP as an edge AP.

In some aspects, network device classifier 370 may determine a classification for an AP according to a count of the number of times an AP is the last AP in a wireless network to disassociate with client devices. Again using the example site 400 illustrated in FIG. 4, users can exit site 400 via entrance/exit 401. Because AP 402A is the nearest AP to entrance/exit 401, AP 402A may be the last AP of wireless network 405 that a UE 424A carried by a user exiting site 400 will be associated with before transitioning off wireless network 405. Similarly, because AP 402D is the nearest to elevator 406, AP 402D may be the last AP of wireless network 405 that a UE 424B carried by a user entering the elevator will be associated with. Network device classifier 370 (or other module of network management system 420) can maintain a count of the number of times an AP 402 is the last AP a client device is associated with before transitioning off wireless network 405. This association will be referred to as a "last association."

Network device classifier 370 can use the last association value to determine if an AP 402 should be classified as an edge AP. As an example, network device 370 may determine a ratio of the number of last associations for an AP to the total number of associations for the AP 402. If the ratio is above a threshold percentage, network device classifier can classify the AP as an edge AP.

In some aspects, network device classifier 370 may determine a classification for an AP according to a count of the number of times a transition is made from the AP to a different AP on a different floor of a site. As an example, a user may leave one floor via stairs, escalator, elevator etc. and go to a different floor. A UE 424 carried by a user may remain connected to wireless network 405, but may disassociate from the AP on the original floor and reassociate with an AP on the different floor. Network device classifier 370 (or other module of network management system 420) can maintain a count of the number of times an AP 402 is the last AP a client device is associated with before a reassociation with an AP on a different floor. Network device classifier 370 may determine that an AP is an edge AP if the count of transitions to an AP on a different floor is comparatively greater for the AP as compared to other APs on the floor. Similarly, network device classifier may utilize a count of transitions from APs on a different floor to the AP to determine if the AP is an edge AP.

VNA/AI engine 350 analyzes network data received from APs 142, 200 as well as its own data to monitor performance of wireless networks 106A-106N. For example, VNA/AI engine 350 may identify network events that may occur during the operation of wireless networks 106A-106N. For example, VNA/AI engine 350 may detect events such as an undesired or abnormal states in one of wireless networks 106A-106N. VNA/AI engine 350 may use root cause analysis module 354 to identify the root cause of any SLE deterioration events and/or undesired or abnormal states. In some examples, root cause analysis module 354 utilizes artificial intelligence-based techniques to help identify the root cause of any poor SLE metric(s) at one or more of wireless network 106A-106N. In some examples, VNA/AI engine 350 may generate and utilize Bayesian statistics and information theory to determine a network component that may be the root cause for the degradation in SLE metrics. VNA/AI engine 350 may determine a classification for an AP as described above. Depending on the classification of the AP, VHA/AI engine 350 may automatically invoke one or more corrective network management actions intended to address the identified root cause(s) of one or more poor SLE metrics. For example, if the AP is not classified as an edge AP, VNA/AI engine may invoke corrective actions. Examples of such corrective actions that may be automatically invoked by VNA/AI engine 350 may include, but are not limited to, invoking RRM 360 to reboot one or more APs and/or adjust/modify the transmit power of a specific radio in a specific AP, adding SSID configuration to a specific AP, changing channels on an AP or a set of APs, etc. The corrective actions may further include restarting a switch and/or a router, invoke downloading of new software to an AP, switch, or router, etc. These corrective actions are given for example purposes only, and the disclosure is not limited in this respect. If automatic corrective actions are not available or do not adequately resolve the root cause, VNA/AI engine 350 may proactively and automatically provide a notification including recommended corrective actions to be taken by IT personnel to address the network error.

If the AP is classified as an edge AP, then in some aspects, VNA/AI engine 350 may determine that no corrective action need be performed on the assumption that the degradation is normal and the result of a UE transitioning off wireless network 405. In this case, the network management action is to bypass corrective actions.

Figure 6A:
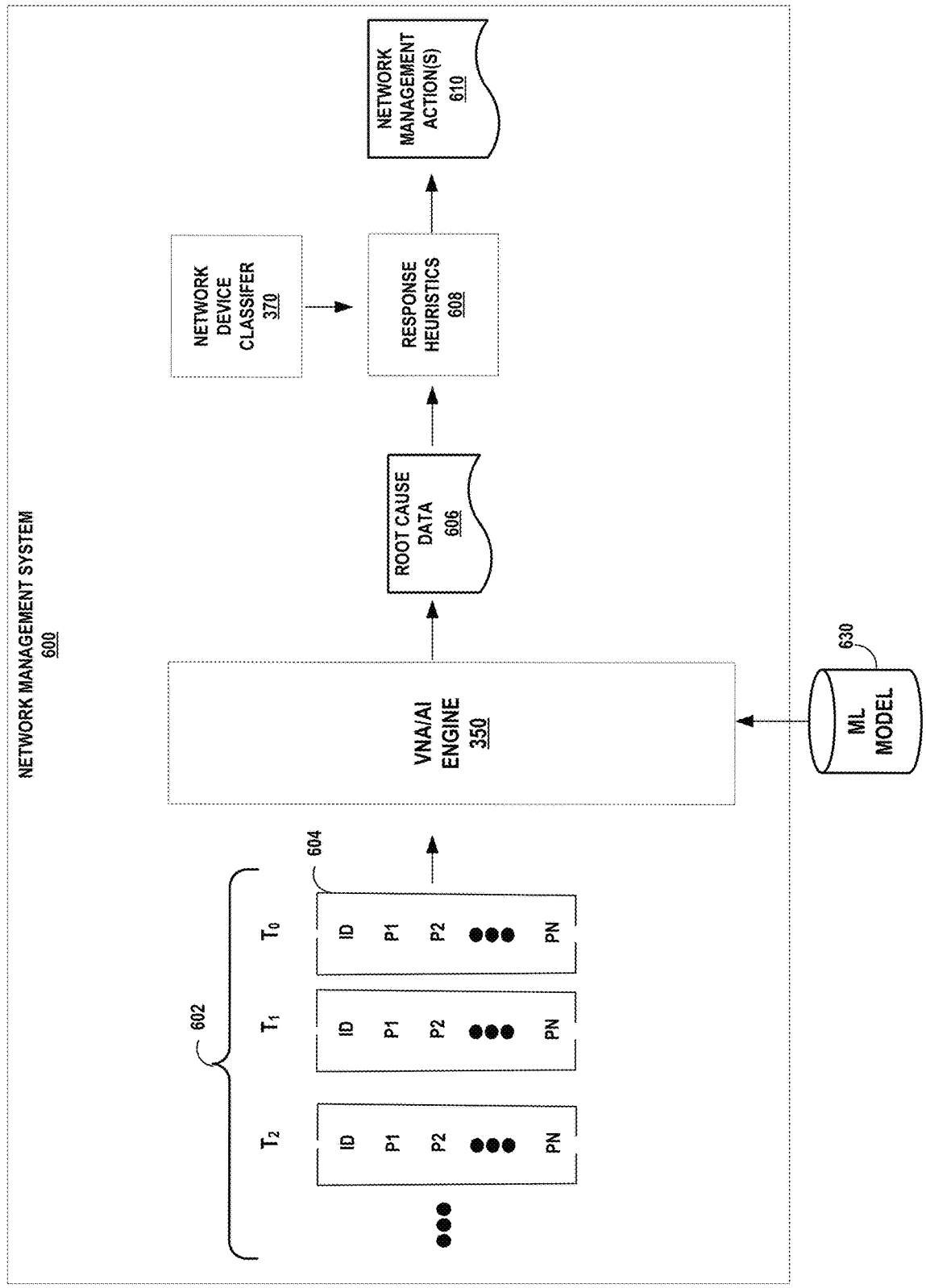
FIGS. 6A and 6B are conceptual diagrams illustrating examples of inputs and outputs of a VNA/AI engine, in accordance with techniques of the disclosure.

FIG. 6A is a conceptual diagram illustrating example inputs and outputs of a VNA/AI engine 350, in accordance with techniques of the disclosure. In the example illustrated in FIG. 6A, VNA/AI engine 350 receives a time series 602 of network data. In some aspects, the time series of network data 602 includes sets of parameters 604. A set of parameters 604 can include SLE metrics, or parameters derived from SLE metrics (denoted as P1-PN in set 604). Additionally, a set of parameters can include an identifier (ID) of the client device associated with the SLE metrics of the corresponding set of parameters 604. In some example implementation the SLE parameters 602 also include an identifier indicating the AP with which the client was associated. Although not shown in FIG. 6, a set of parameters 604 can also include a timestamp of when the SLE parameters were created or collected.

VNA/AI engine 350 can receive the time series 602 of network data and, in response to detection of a network event such as a degradation in SLE metrics, can analyze the time series 602 of network data to determine root cause data 606 associated with the degradation in SLE metrics. In some aspects, root cause data can include, in addition to an identification of the root cause of the degradation in SLE metrics, a corrective action or actions to remediate the degradation in SLE metrics. NMS 300, in some aspects, can automatically apply the corrective actions. Network management system 600 can perform response heuristics 608 to determine network management actions to remedy, if necessary, the root cause of the degradation in SLE metrics.

In some aspects, VNA/AI engine 350 may utilize a machine learning model 630 as part of determining root cause data 606. In some aspects, machine learning model 630 is constructed during a supervised or unsupervised training phase. After such training, parameters P1-PN are supplied in real time (or near real time) as input to machine learning model 630 to determine root cause 606. In the example illustrated in FIG. 6A, network device classifier 370 can implement one or more heuristics to classify an AP that are independent of the heuristics used by machine learning model 630 to determine root cause data 606.

Network management system 600 can determine a classification of an AP that is associated with the degradation in SLE metrics from network device classifier 370 described above. If the AP is classified as an edge AP, response heuristics 608 may determine that the network management action 610 is to bypass any corrective actions recommended in root cause data 606. Alternatively, response heuristics 608 may determine a network management action 610 that is an alternative to any corrective actions recommended in root cause data 606. For example, response heuristics 608 may determine that the network management action is to recommend placement of additional APs near the AP whose client devices have experienced degraded SLE metrics. As noted above, the network management system 600 can be configured to provide network management actions 610 that are based on a client configuration, and may be different from client to client.

In some aspects, network management system 600 can be configured to provide network management actions 610 that are based on a specific site configuration, and may be different from one specific site to another specific site. For example, some site operators may configure network management system 600 such that the network management action for APs classified as edge APs is to bypass some or all of the corrective actions recommend by VNA/AI engine 350. Other site operators may configure network management system 600 such that the network management action is to alert an IT technician about the network event. recommend placement of additional APs near the location of the identified edge AP. For example, it may be considered advantageous by a site operator to facilitate smooth transitions on and off wireless network 405. A degradation in SLE metrics may result in transitions that are not smooth. Thus, in the case of a degradation of SLE metrics associate with an edge AP, VNA/AI engine 350 may recommend placement of additional APs.

Figure 6B:
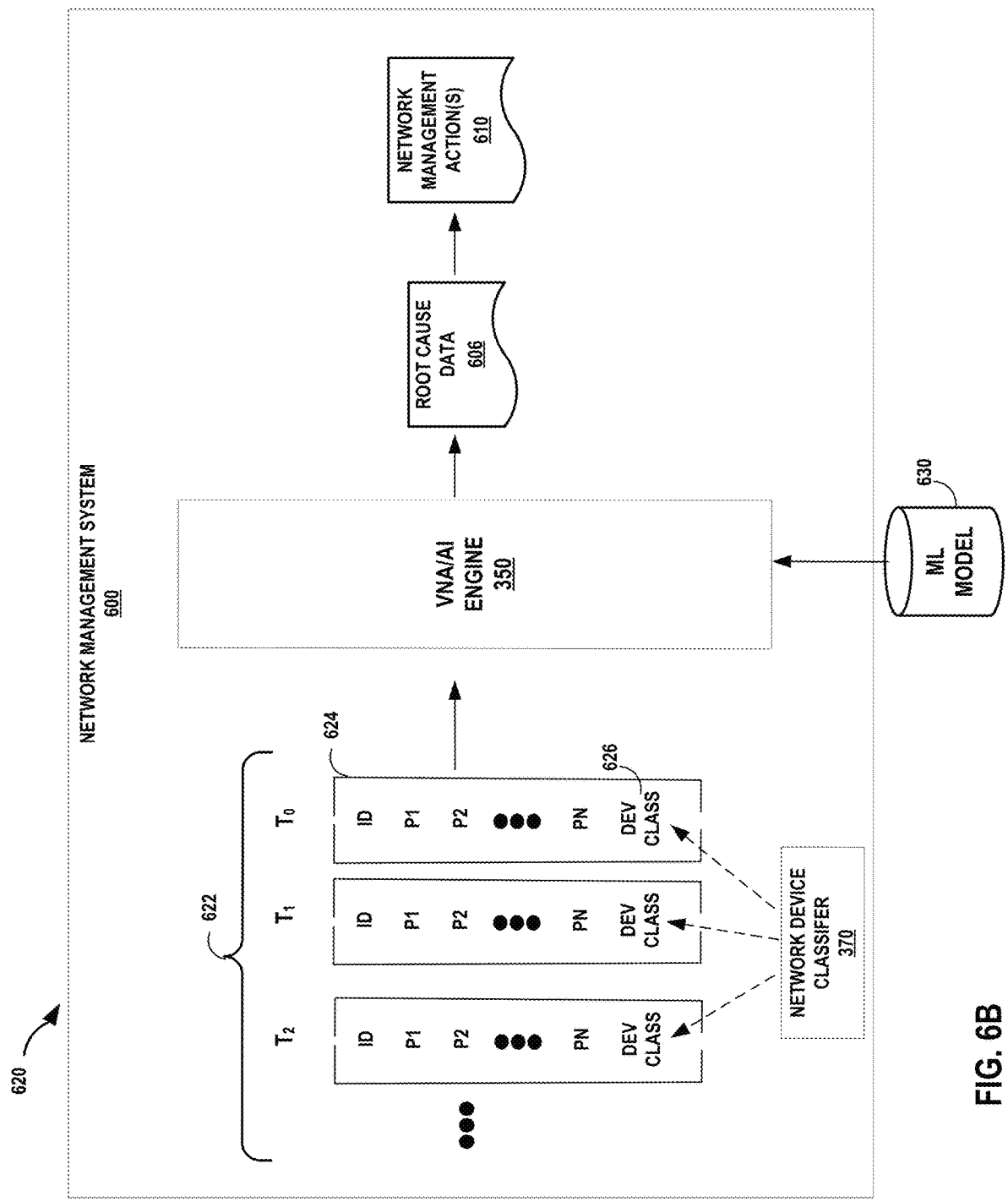

FIG. 6B is a conceptual diagram illustrating another set of example inputs and outputs of a VNA/AI engine 350, in accordance with techniques of the disclosure. In the example illustrated in FIG. 6B, VNA/AI engine 350 receives a time series 622 of network data. In some aspects, the time series of network data 622 includes sets of parameters 624, which, in addition to the parameters 604 discussed above with respect to FIG. 6A, can include device classification 626. Device classification 626 can specify the classification of the device that was the source of the parameters P1-PN.

VNA/AI engine 350 can receive the time series 622 of network data and, in response to a network event such as a degradation in SLE metrics, can analyze the time series 622 of network data to determine root cause data 606 associated with the degradation in SLE metrics. In some aspects, root cause data can include, in addition to an identification of the root cause of the degradation in SLE metrics, a corrective action or actions to remediate the degradation in SLE metrics. NMS 300, in some aspects, can automatically apply the corrective actions.

In some aspects, VNA/AI engine 350 may utilize a machine learning model 630 as part of determining root cause data 606. In some aspects, machine learning model 630 is constructed during a supervised or unsupervised training phase. Training data used to construct machine learning model 630 can include parameters P1-PN and device classification data. After such training, parameters P1-PN and device classification data can be supplied in real time (or near real time) as input to machine learning model 630 to determine root cause data 606. Network management system 600 can use the root cause data to determine network management actions 610.

Network management system 600 can determine a classification of an AP that is associated with the degradation in SLE metrics from network device classifier 370 described above. If the AP is classified as an edge AP, response heuristics 608 may determine that the network management action 610 is to bypass any corrective actions recommended in root cause data 606. Alternatively, response heuristics 608 may determine a network management action 610 that is an alternative to any corrective actions recommended in root cause data 606. For example, response heuristics 608 may determine that the network management action is to alert a technician. Yet other heuristics may recommend placement of additional APs near the AP whose client devices have experienced degraded SLE metrics. As noted above, the network management system 600 can be configured to provide network management actions 610 that are based on a client configuration, and may be different from client to client.

Figure 7:
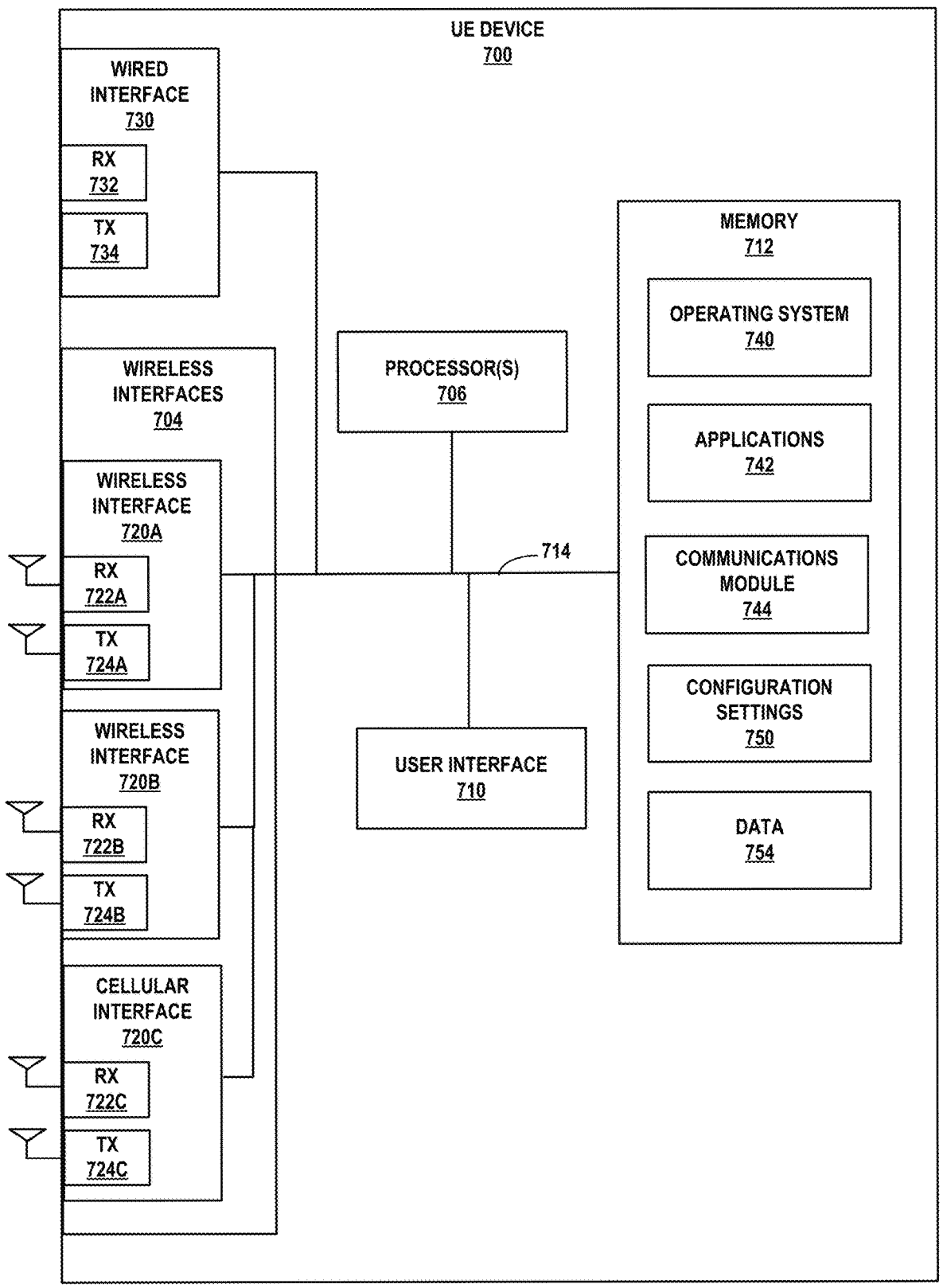
FIG. 7 is a block diagram of an example user equipment device, in accordance with one or more techniques of the disclosure.

FIG. 7 shows an example user equipment (UE) device 700. Example UE device 700 shown in FIG. 7 may be used to implement any of UEs 148 as shown and described herein with respect to FIG. 1. UE device 700 may include any type of wireless client device, and the disclosure is not limited in this respect. For example, UE device 700 may include a mobile device such as a smart phone, tablet or laptop computer, a personal digital assistant (PDA), a wireless terminal, a smart watch, a smart ring or any other type of mobile or wearable device. UE 700 may also include any type of IoT client device such as a printer, a security sensor or device, an environmental sensor, or any other connected device configured to communicate over one or more wireless networks.

In accordance with one or more techniques of the disclosure, network data indicative of one or more aspects of the performance of a wireless network (that is, data used by NMS 150 to calculate one or more SLE metrics) is received from each UE 700 in a wireless network. For example, NMS 150 receives network data from UEs 148 in networks 106A-106N of FIG. 1. In some examples, NMS 150 receives relevant network data from UEs 148 on a continuous basis (e.g., every 2 seconds or other appropriate time period), and NMS may calculate one or more SLE metrics for each UE on a periodic basis as defined by a first predetermined period of time (e.g., every 10 minutes or other predetermined time period).

UE device 700 includes a wired interface 730, wireless interfaces 720A-720C, one or more processor(s) 706, memory 712, and a user interface 710. The various elements are coupled together via a bus 714 over which the various elements may exchange data and information. Wired interface 730 includes a receiver 732 and a transmitter 734. Wired interface 730 may be used, if desired, to couple UE 700 to network(s) 134 of FIG. 1. First, second and third wireless interfaces 720A, 720B, and 720C include receivers 722A, 722B, and 722C, respectively, each including a receive antenna via which UE 700 may receive wireless signals from wireless communications devices, such as APs 142 of FIG. 1, AP 200 of FIG. 2, other UEs 148, or other devices configured for wireless communication. First, second, and third wireless interfaces 720A, 720B, and 720C further include transmitters 724A, 724B, and 724C, respectively, each including transmit antennas via which UE 700 may transmit wireless signals to wireless communications devices, such as APs 142 of FIG. 1, AP 200 of FIG. 2, other UEs 148 and/or other devices configured for wireless communication. In some examples, first wireless interface 720A may include a Wi-Fi 802.11 interface (e.g., 2.4 GHz and/or 5 GHz) and second wireless interface 720B may include a Bluetooth interface and/or a Bluetooth Low Energy interface. Third wireless interface 720C may include, for example, a cellular interface through which UE device 700 may connect to a cellular network.

Processor(s) 706 execute software instructions, such as those used to define a software or computer program, stored to a computer-readable storage medium (such as memory 712), such as non-transitory computer-readable mediums including a storage device (e.g., a disk drive, or an optical drive) or a memory (such as Flash memory or RAM) or any other type of volatile or non-volatile memory, that stores instructions to cause the one or more processors 706 to perform the techniques described herein.

Memory 712 includes one or more devices configured to store programming modules and/or data associated with operation of UE 700. For example, memory 712 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 706 to perform the techniques described herein.

In this example, memory 712 includes an operating system 740, applications 742, a communications module 744, configuration settings 750, and data storage 754. Data storage 754 may include, for example, a status/error log including network data specific to UE 700. The network data may include event data such as a log of normal events and error events according to a logging level based on instructions from the network management system (e.g., NMS 150/300). Data storage 754 may store any data used and/or generated by UE 700, such as network data used to calculate one or more SLE metrics that is collected by UE 700 and transmitted to any of APs 142 in a wireless network 106 for further transmission to NMS 150.

Communications module 744 includes program code that, when executed by processor(s) 706, enables UE 700 to communicate using any of wired interface(s) 730, wireless interfaces 720A-720B and/or cellular interface 750C. Configuration settings 750 include any device settings for UE 700 settings for each of wireless interface(s) 720A-720B and/or cellular interface 720C. Configuration settings 750 may also include device settings for UE 700 wired network interfaces, when such interfaces are present on UE 700.

Figure 8:
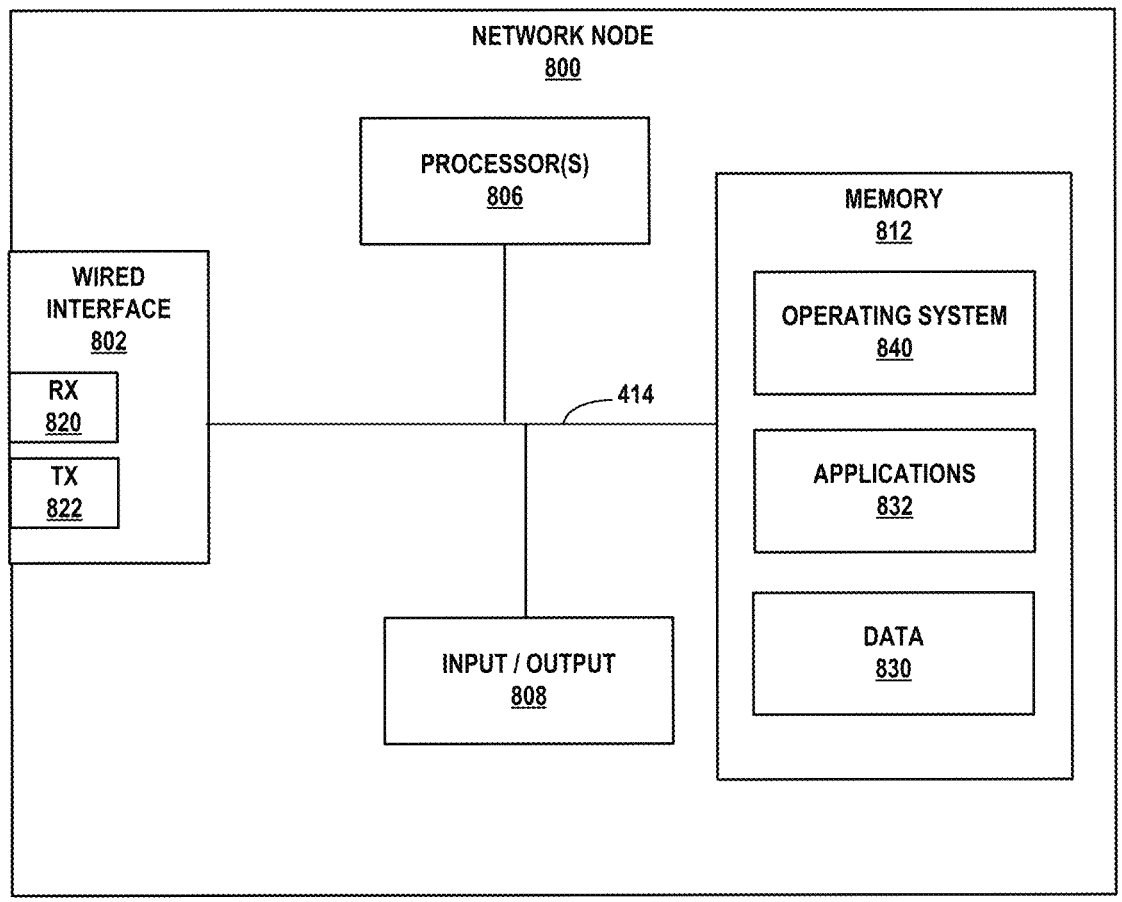
FIG. 8 is a block diagram of an example network node, such as a router or switch, in accordance with one or more techniques of the disclosure.

FIG. 8 is a block diagram illustrating an example network node (or server) 800 configured according to the techniques described herein. In one or more examples, the network node 800 implements a device or a server attached to the network 134 of FIG. 1, e.g., router, switch, AAA server, DHCP server, DNS server, VNA, Web server, etc., or a network device such as, e.g., routers, switches or the like. In some embodiments, network node 800 of FIG. 8 is server 110, 116, 122, 128, of FIG. 1 or routers/switches of network 134 of FIG. 1.

In this example, network node 800 includes a communications interface 802, e.g., an Ethernet interface, a processor 806, input/output 808, e.g., display, buttons, keyboard, keypad, touch screen, mouse, etc., a memory 812 and an assembly of components 816, e.g., assembly of hardware module, e.g., assembly of circuits, coupled together via a bus 809 over which the various elements may interchange data and information. Communications interface 802 couples the network node 800 to a network, such as an enterprise network.

Though only one interface is shown by way of example, those skilled in the art should recognize that network nodes may, and usually do, have multiple communication interfaces. Communications interface 802 includes a receiver 820 via which the network node 800, e.g. a server, can receive data and information, e.g., including operation related information, e.g., registration request, AAA services, DHCP requests, Simple Notification Service (SNS) look-ups, and Web page requests. Communications interface 802 includes a transmitter 822, via which the network node 800, e.g., a server, can send data and information, e.g., including configuration information, authentication information, web page data, etc.

Memory 812 stores executable software applications 832, operating system 840 and data/information 830. Data 830 includes system log and/or error log that stores network data and/or SLE metrics for node 800 and/or other devices, such as wireless access points, based on a logging level according to instructions from the network management system.

Figure 9:
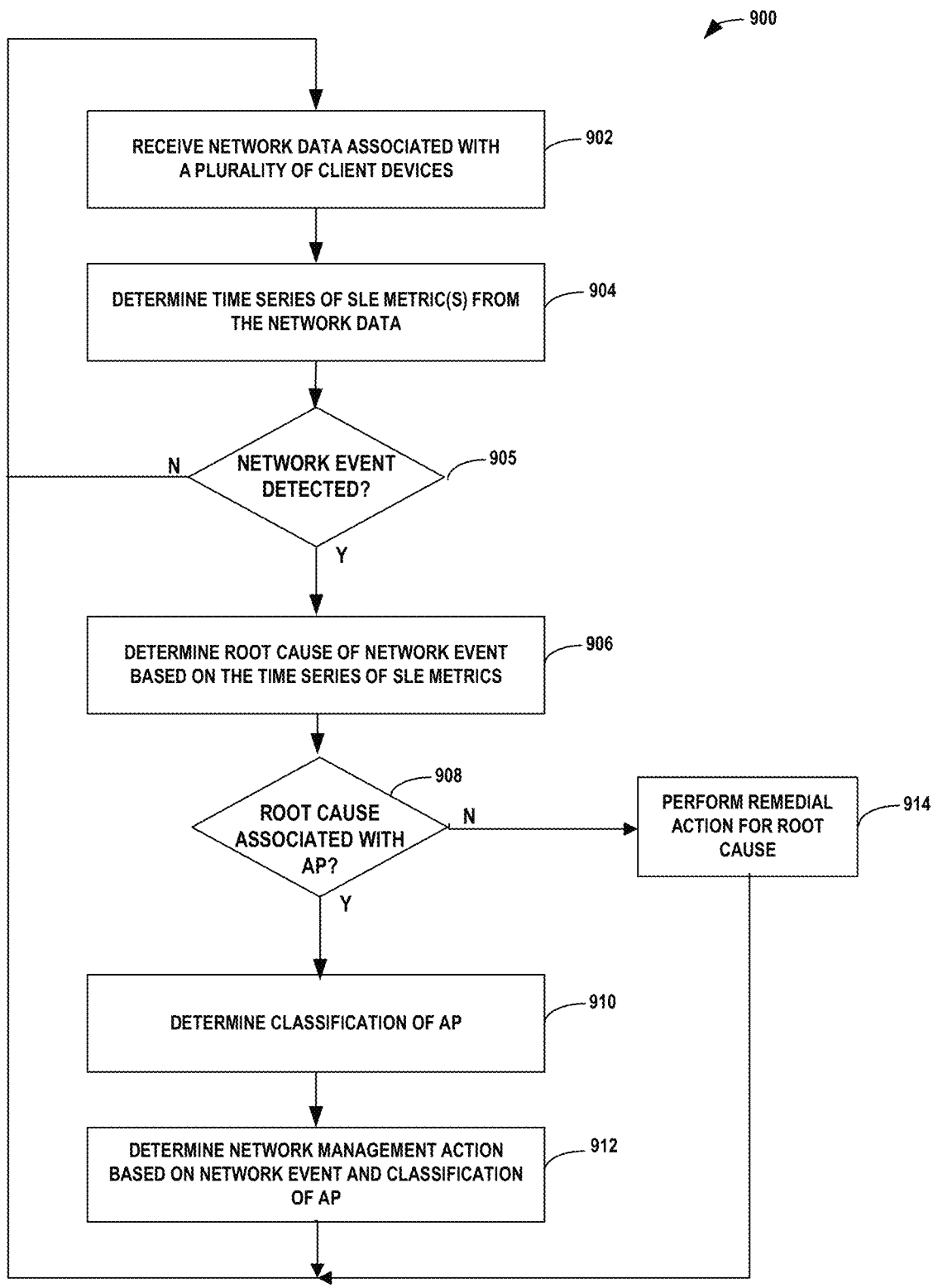
FIG. 9 is a flowchart of example operations performed by a network management system to classify access points and perform network management actions based on the classification of the access point, in accordance with one or more techniques of the disclosure.

FIG. 9 is a flowchart (900) of example operations performed by a network management system to determine a network management action based on a classification of an AP. The operations may be performed by a network management system, such as NMS 150, 300 and/or 600 as shown in FIGS. 1, 3, 6A and 6B.

One or more processor(s), such as one or more processor(s) 306 of NMS 300, receives network data associated with a plurality of client devices in a wireless network (902). The client devices may include, for example, any of UEs 148, and the wireless network may include, for example, wireless network 106. The network data may be received, for example, as time series data monitored at one or more periodic intervals. The network data may be measured or collected by, for example, one or more client devices and/or one or more APs associated with the wireless network, and transmitted to the NMS via network(s) 134.

The one or more processor(s) determine a time series of SLE metrics based on the received network data (904). The network data may include the SLE metrics or data used to derive SLE metrics, identifiers for the client devices for which data was collected (e.g., UEs), and the APs with which the client devices were associated. For example, the one or more processor(s) may execute a virtual network assistant 350 or other heuristics to determine a root cause of SLE degradation based on any one or more of a time to connect metric, a throughput metric, a coverage metric, a capacity metric, a roaming metric, a successful connects metric, and/or an AP health metric. In addition or alternatively, this may include determining root cause of SLE deterioration based on a received signal strength indicator (RSSI) and/or a signal-to-noise (SNR) of the wireless signal received from a current AP to which the client device is associated.

The one or more processors may determine if a network event has occurred (905). As an example, the one or more processors may determine, based on the time series of SLE metrics, that there has been a degradation in the SLE metrics.

If a network event is not detected based on the time series of SLE metrics ("NO" branch of 905), the network management system can continue to receive and monitor SLE metrics (902). If a network event is detected ("YES" branch of 905), the one or more processor(s) further determine a root cause for the network event based on the time series of SLE metrics (906).

The network management system can determine if the root cause is associated with an AP (908). For example, the one or more processor(s) may determine that there has been an issue with a specific AP that caused degradation in SLE metrics for the UEs. If the root cause is associated with an AP ("YES" branch of 908), then the one or more processors may determine a classification of the AP (910). For example, the classification may be based on betweenness centrality of the AP, or heuristics such as connection times of client devices of the AP, bandwidth utilization of the AP, or any of the techniques described herein. Further details on techniques for determining whether an AP is an edge AP are discussed below with respect to FIG. 11.

The one or more processors may apply machine learning techniques and other heuristics to the SLE metrics and the classification of the AP device to determine a network management action based on the network event and the classification of the AP (912). The network management system can continue to receive further network data from client devices in the wireless network (902).

If the network management system determines that the root cause is not associated with an AP ("NO" branch of 908), the network management system may perform mitigation actions to remediate the root cause of the network event. As an example, a network event may be associated with a switch, router, or other network device other than an AP. The network management system can perform mitigation actions with respect to the switch, router, or other network device. The network management system can continue to receive further network data from client devices in the wireless network (902).

Figure 10:
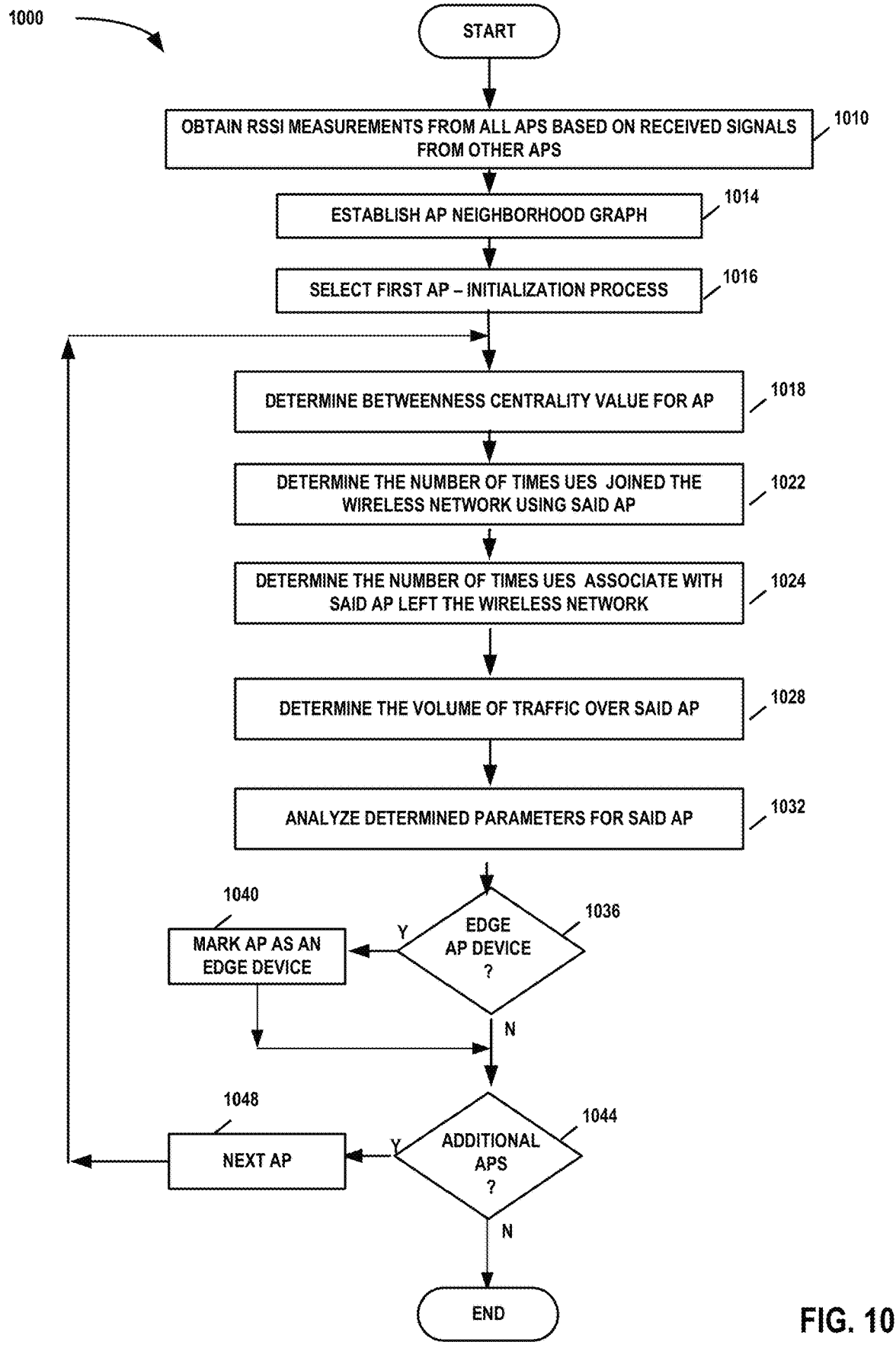
FIG. 10 is a flowchart illustrating example operations performed by a network management system to determine a classification of an AP.

FIG. 10 is a flowchart (1000) illustrating example operations performed by a network management system to determine a classification of an AP. The operations may be performed by a network management system, such as NMS 150, 300 and/or 600 as shown in FIGS. 1, 3, 6A and 6B.

One or more processor(s), such as one or more processor(s) 306 of NMS 300, receives network data from each AP 142 indicative of the measured strength of signal they receive from other APs 142 (1010).

The NMS can construct a network neighborhood graph wherein each node represents an AP and each edge represents an RSSI signal originating from a transmission by a first AP which was received by a second AP with an RSSI greater than a predetermined threshold (1014).

The NMS can perform an initialization process which includes selection of an initial AP from a list that includes all of the APs (1016). NMS 300 can utilize the neighborhood graph to determine the betweenness centrality of the AP (1018). The betweenness algorithm is one example of a method for determining whether an AP resides in the center or at the periphery of the neighborhood graph used in some implementations. Other implementations may use different methods for determining whether an AP resides in the center or at the periphery of the neighborhood graph.

The NMS can determine, for each AP in the wireless network, a normalized number of times a UE joined the wireless network using the AP during a predetermined time period, e.g., in the last week (1022). Similarly, the NMS can determine, for each AP in the wireless network, the normalized number of times a UE which was associated with the AP left the wireless network during a predetermined time period, e.g., in the last week (1024). In accordance with one example implementation the normalization operation may include dividing the number of times a UE joined (or left) the network by the number of UEs which were associated with the wireless network during the abovementioned time period.

The NMS can determine, for each AP in the wireless network, a measure of a cumulative number of packets transported via the AP during a predetermined time period (1028). In accordance with one example implementation the measure is the number of packets through the specific AP divided by the number of packets transmitted via the wireless network during a predetermined time period.

The flowchart 1000 indicate examples of measurement of four parameters such as a measure of the betweenness centrality, a measure of the number of UEs entering the network via the AP, a measure of the number of UEs exiting the network via the AP, and a measure of the load of the network via the AP. Other measures may be used for determining an edge AP classification instead of, or in addition to those discussed above.

The NMS can analyze the abovementioned parameters either separately or in aggregation and determine whether the AP should be classified as an edge AP (1032). For example, the NMS can compare each one of the abovementioned parameters to a specific predetermined parameter and determines that the AP is an edge AP if any specific parameter meets a predetermined criterion. In another example implementation, the NMS can determine an aggregated measure of the abovementioned parameters and determine that the AP is classified as an edge AP if the aggregated measure of the abovementioned parameters meets a predetermined criterion.

The NMS can determine whether in operation 1032 the AP was determined to be an edge AP (1036). If the AP is classified as an edge AP ("YES" branch of 1036) the NMS indicates the AP is classified as an edge AP. For example, the NMS can mark or tag the AP as an edge AP in a device database. If the NMS determines that the AP is not classified as an edge AP ("NO" branch of 1036, the AP is not marked or tagged as an edge AP. In some aspects, the AP may be marked or tagged as an interior AP.

After determining a classification for an AP as described above, the NMS can determine whether there are further APs that need to be examined to determine whether they are an edge device (1044). If so ("YES" branch or 1044), then the next AP to be examined is selected (1048) and the NMS returns to operation 1018. The NMS can repeat the above described process until all of the APs are marked accordingly as either being an edge device or not an edge device.

In accordance with one implementation once all of the APs were determined to be either an edge device or not an edge device, the method ends. In according to another example implementation, the NMS can periodically reexamine and determine AP classification of APs, or determine classification of new APs added to the wireless network.

In accordance with another example implementation, the NMS can periodically perform the operations shown in flowchart 1000 to recalculate the neighborhood graph to ensure that changes in the transmission power that may have been performed in compliance with instructions from the radio resource manager (RRM 360, FIG. 3) are properly reflected in the neighborhood graph and consequently in the betweenness centricity of each AP.

Figure 11:
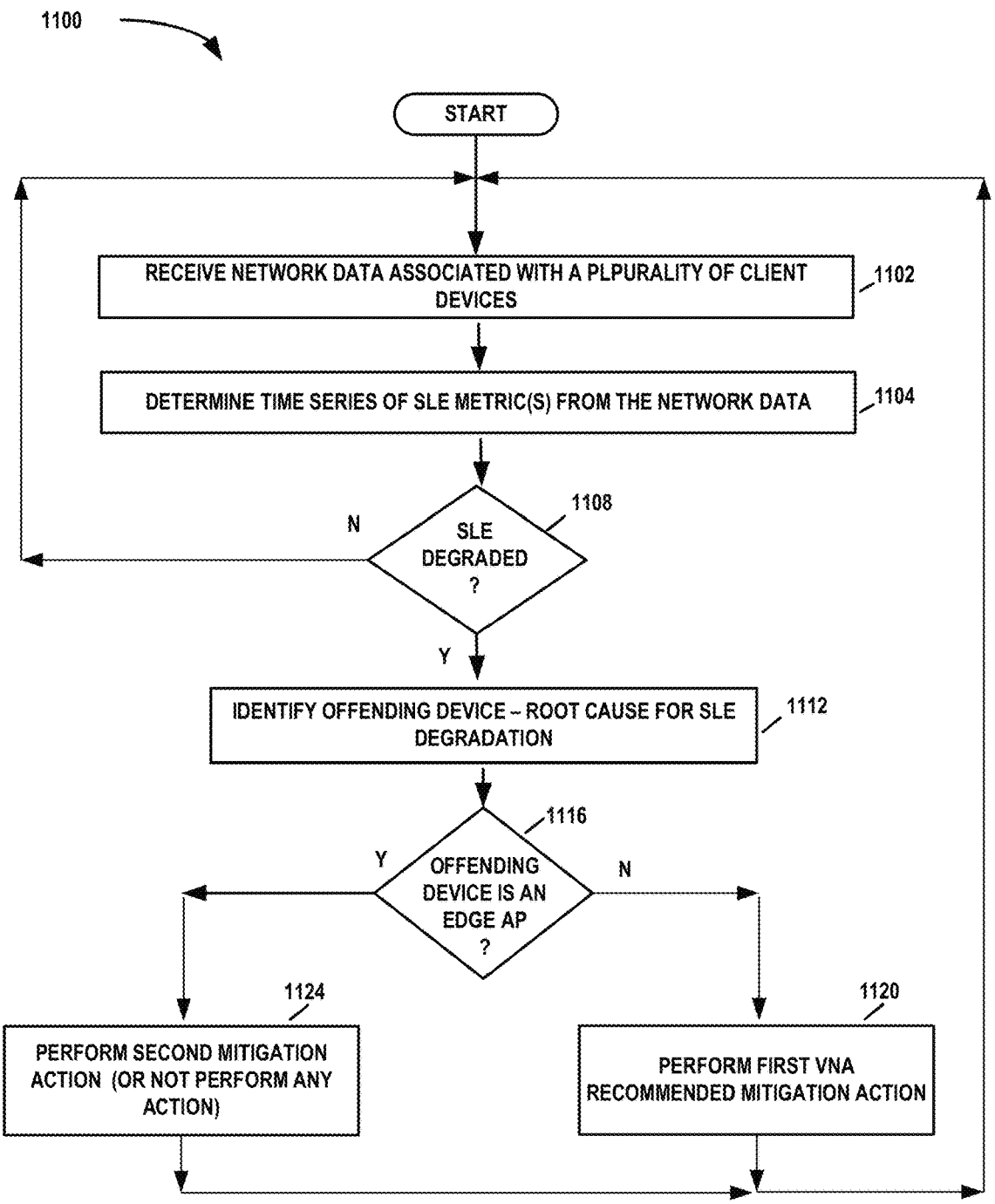
FIG. 11 is a flowchart illustrating example operations performed by a network management system to determine a network management action based on a classification of an AP.

FIG. 11 is a flowchart (1100) illustrating example operations performed by a network management system to determine a network management action based on a classification of an AP. The operations may be performed by a network management system, such as NMS 150, 300 and/or 600 as shown in FIGS. 1, 3, 6A and 6B.

One or more processor(s), such as one or more processor(s) 306 of NMS 300, receives network data associated with a plurality of client devices in a wireless network (1102). The client devices may include, for example, any of UEs 148, and the wireless network may include, for example, wireless network 106. The network data may be received, for example, as time series data monitored at one or more periodic intervals. The network data may be measured or collected by, for example, one or more client devices and/or one or more APs associated with the wireless network, and transmitted to the NMS via network(s) 134.

The one or more processor(s) determine a time series of SLE metrics based on the received network data (1104). The network data may include the SLE metrics or data used to derive SLE metrics, identifiers for the client devices for which data was collected (e.g., UEs), and the APs with which the client devices were associated.

The one or more processors can examine the measured SLE metric(s) and compare the measured SLE metric(s) against a threshold that may be defined by the limit of normal/acceptable SLE measurement (1108). If the one or more processors determine that the network provides an acceptable SLE (e.g., the Wi-Fi network works as designed) ("NO" branch of 1108), the one or more processors can continue to monitor the network operation (1102). However if the one or more processors determine that the SLE metric(s) indicate that the network performance has deteriorated below a predetermined criterion ("YES" branch of 1108), a VNA/AI of the NMS can use the measured SLE parameters to determine and identify the root cause of the SLE deterioration (1112).

The NMS can examine whether the identified root cause of the SLE deterioration is an edge AP (1116). The process of determining whether an AP is an edge device has been described in greater detail above with respect to the flowchart of FIG. 10.

If the NMS determines that the offending device is not an edge AP ("NO" branch of 1116), the NMS proceeds with a normal recovery process based on a first VNA/AI recommended mitigation action (1120). However if the NMS determines that the offending device is an edge AP ("YES" branch of 1116), the NMS proceeds with a second mitigation action which could be less intrusive than the first mitigation action (1124). For example the second mitigation action may be just a notification to a technician, an update of statistics, or just ignoring the SLE deterioration altogether (e.g., bypassing any mitigation actions).

The NMS can continue to monitor the operation of the system by repeating the operations of flowchart 1100 beginning with collecting and examining additional time series SLE metric(s) (1102).

The discussion above has been generally presented in the context of an NMS that bypasses mitigation action for a root cause when an AP is classified as an edge AP. The techniques disclosed herein apply as well to the case wherein AP devices are classified as centric or interior AP devices (rather than edge devices) and a different mitigation action is taken for centric or interior devices than the actions taken for non-centric or non-interior AP devices. Further, the techniques disclosed herein may be used to determine edge, interior and/or centric classifications of other network devices such as switches, routers etc. and to determine a network management action based on such classification.

The techniques described herein may be implemented using software, hardware and/or a combination of software and hardware. Various examples are directed to apparatus, e.g., mobile nodes, mobile wireless terminals, base stations, e.g., access points, communications system. Various examples are also directed to methods, e.g., method of controlling and/or operating a communications device, e.g., wireless terminals (UEs), base stations, control nodes, access points and/or communications systems. Various examples are also directed to non-transitory machine, e.g., computer readable medium, e.g., ROM, RAM, CDs, hard discs, etc., which include machine readable instructions for controlling a machine to implement one or more operations of a method.

It is understood that the specific order or hierarchy of operations in the processes disclosed is an example approach. Based upon design preferences, it is understood that the specific order or hierarchy of operations in the processes may be rearranged while remaining within the scope of the present disclosure. The accompanying method claims present elements of the various operations in a sample order and are not meant to be limited to the specific order or hierarchy presented.

In various examples devices and nodes described herein are implemented using one or more modules to perform the operations corresponding to one or more methods, for example, signal generation, transmitting, processing, and/or receiving operations. Thus, in some examples various features are implemented using modules. Such modules may be implemented using software, hardware or a combination of software and hardware. In some examples each module is implemented as an individual circuit with the device or system including a separate circuit for implementing the function corresponding to each described module. Many of the above described methods or method operations can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various examples are directed to a machine-readable medium e.g., a non-transitory computer readable medium, including machine executable instructions for causing a machine, e.g., processor and associated hardware, to perform one or more of the operations of the above-described method(s). Some examples are directed to a device including a processor configured to implement one, multiple, or all of the operations of one or more methods of the one example aspect.

In some examples, the processor or processors, e.g., CPUs, of one or more devices, e.g., communications devices such as wireless terminals (UEs), and/or access nodes, are configured to perform the operations of the methods described as being performed by the devices. The configuration of the processor may be achieved by using one or more modules, e.g., software modules, to control processor configuration and/or by including hardware in the processor, e.g., hardware modules, to perform the recited operations and/or control processor configuration. Accordingly, some but not all examples are directed to a communications device, e.g., user equipment, with a processor which includes a module corresponding to each of the operations of the various described methods performed by the device in which the processor is included. In some but not all examples a communications device includes a module corresponding to each of the operations of the various described methods performed by the device in which the processor is included. The modules may be implemented purely in hardware, e.g., as circuits, or may be implemented using software and/or hardware or a combination of software and hardware.

Some examples are directed to a computer program product comprising a computer-readable medium comprising code for causing a computer, or multiple computers, to implement various functions, operations, acts and/or steps, e.g. one or more operations described above. In some examples, the computer program product can, and sometimes does, include different code for each operation to be performed. Thus, the computer program product may, and sometimes does, include code for each individual operation of a method, e.g., a method of operating a communications device, e.g., a wireless terminal or node. The code may be in the form of machine, e.g., computer, executable instructions stored on a computer-readable medium such as a RAM (Random Access Memory), ROM (Read Only Memory) or other type of storage device. In addition to being directed to a computer program product, some examples are directed to a processor configured to implement one or more of the various functions, steps, acts and/or operations of one or more methods described above. Accordingly, some examples are directed to a processor, e.g., CPU, graphical processing unit (GPU), digital signal processing (DSP) unit, etc., configured to implement some or all of the operations of the methods described herein. The processor may be for use in, e.g., a communications device or other device described in the present application.

Numerous additional variations on the methods and apparatus of the various examples described above will be apparent to those skilled in the art in view of the above description. Such variations are to be considered within the scope of this disclosure. The methods and apparatus may be, and in various examples are, used with BLE, LTE, CDMA, orthogonal frequency division multiplexing (OFDM), and/or various other types of communications techniques which may be used to provide wireless communications links between access nodes and mobile nodes. In some examples the access nodes are implemented as base stations which establish communications links with user equipment devices, e.g., mobile nodes, using OFDM and/or CDMA. In various examples the mobile nodes are implemented as notebook computers, personal data assistants (PDAs), or other portable devices including receiver/transmitter circuits and logic and/or routines, for implementing the methods.

In the detailed description, numerous specific details are set forth in order to provide a thorough understanding of some examples. However, it will be understood by persons of ordinary skill in the art that some examples may be practiced without these specific details. In other instances, well-known methods, procedures, components, units and/or circuits have not been described in detail so as not to obscure the discussion.

Some examples may be used in conjunction with various devices and systems, for example, a User Equipment (UE), a Mobile Device (MD), a wireless station (STA), a wireless terminal (WT), a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some examples may be used in conjunction with devices and/or networks operating in accordance with existing Wireless-Gigabit-Alliance (WGA) specifications (Wireless Gigabit Alliance, Inc. WiGig MAC and PHY Specification Version 1.1, April 2011, Final specification) and/or future versions and/or derivatives thereof, devices and/or networks operating in accordance with existing IEEE 802.11 standards (IEEE 802.11-2012, IEEE Standard for Information technology-Telecommunications and information exchange between systems Local and metropolitan area networks-Specific requirements Part 11: Wireless LAN Medium Access Control (MAC) and Physical Layer (PHY) Specifications, Mar. 29, 2012; IEEE802.11ac-2013 ("IEEE P802.11ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 7: Enhancements for Very High Throughput for Operation in Bands below 6 GHz", December, 2013); IEEE 802.11 ad ("IEEE P802.11 ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band", 28 Dec. 2012); IEEE-802.11REVmc ("IEEE 802.11-REVmcTM/D3.0, June 2014 draft standard for Information technology—Telecommunications and information exchange between systems Local and metropolitan area networks Specific requirements; Part 11: Wireless LAN Medium Access Control (MAC) and Physical Layer (PHY) Specification"); IEEE802.11-ay (P802.11 ay Standard for Information Technology-Telecommunications and Information Exchange Between Systems Local and Metropolitan Area Networks-Specific Requirements Part 11: Wireless LAN Medium Access Control (MAC) and Physical Layer (PHY) Specifications-Amendment: Enhanced Throughput for Operation in License-Exempt Bands Above 75 GHz)), IEEE 802.11-2016 and/or future versions and/or derivatives thereof, devices and/or networks operating in accordance with existing Wireless Fidelity (Wi-Fi) Alliance (WFA) Peer-to-Peer (P2P) specifications (Wi-Fi P2P technical specification, version 1.5, August 2014) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, or operate using any one or more of the above protocols, and the like.

Some examples may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some examples may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth, Global Positioning System (GPS), Wi-Fi, Wi-Max, ZigBee™, Ultra-Wideband (UWB), Global System for Mobile communication (GSM), 2G, 2.5G, 3G, 3.5G, 7G, Fifth Generation (5G), or Sixth Generation (6G) mobile networks, 3GPP, Long Term Evolution (LTE), LTE advanced, Enhanced Data rates for GSM Evolution (EDGE), or the like. Other examples may be used in various other devices, systems and/or networks.

Some demonstrative examples may be used in conjunction with a WLAN (Wireless Local Area Network), e.g., a Wi-Fi network. Other examples may be used in conjunction with any other suitable wireless communication network, for example, a wireless area network, a "piconet", a WPAN, a WVAN, and the like.

Some examples may be used in conjunction with a wireless communication network communicating over a frequency band of 2.4 Ghz, 5 GHz and/or 60 GHz. However, other examples may be implemented utilizing any other suitable wireless communication frequency band(s), for example, an Extremely High Frequency (EHF) band (the millimeter wave (mmWave) frequency band), e.g., a frequency band within the frequency band of between 20 GhH and 300 GHz, a WLAN frequency band, a WPAN frequency band, a frequency band according to the WGA specification, and the like.

While the above provides just some simple examples of the various device configurations, it is to be appreciated that numerous variations and permutations are possible. Moreover, the technology is not limited to any specific channels, but is generally applicable to any frequency range(s)/channel(s). Moreover, and as discussed, the technology may be useful in the unlicensed spectrum.

Although examples are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, a communication system or subsystem, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although examples are not limited in this regard, the terms "plurality" and "a plurality" as used herein may include, for example, "multiple" or "two or more." The terms "plurality" or "a plurality" may be used throughout the specification to describe two or more components, devices, elements, units, parameters, circuits, or the like. For example, "a plurality of stations" may include two or more stations.

It may be advantageous to set forth definitions of certain words and phrases used throughout this document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, interconnected with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, circuitry, firmware or software, or some combination of at least two of the same. It should be noted that the functionality associated with any particular controller may be centralized or distributed, whether locally or remotely. Definitions for certain words and phrases are provided throughout this document and those of ordinary skill in the art should understand that in many, if not most instances, such definitions apply to prior, as well as future uses of such defined words and phrases.

The examples have been described in relation to communications systems, as well as protocols, techniques, means and methods for performing communications, such as in a wireless network, or in general in any communications network operating using any communications protocol(s). Examples of such are home or access networks, wireless home networks, wireless corporate networks, and the like. It should be appreciated however that in general, the systems, methods and techniques disclosed herein will work equally well for other types of communications environments, networks and/or protocols.

For purposes of explanation, numerous details are set forth in order to provide a thorough understanding of the present techniques. It should be appreciated however that the present disclosure may be practiced in a variety of ways beyond the specific details set forth herein. Furthermore, while the examples illustrated herein show various components of the system collocated, it is to be appreciated that the various components of the system can be located at distant portions of a distributed network, such as a communications network, node, within a Domain Master, and/or the Internet, or within a dedicated secured, unsecured, and/or encrypted system and/or within a network operation or management device that is located inside or outside the network. As an example, a Domain Master can also be used to refer to any device, system or module that manages and/or configures or communicates with any one or more aspects of the network or communications environment and/or transceiver(s) and/or stations and/or access point(s) described herein.

Thus, it should be appreciated that the components of the system can be combined into one or more devices, or split between devices, such as a transceiver, an access point, a station, a Domain Master, a network operation or management device, a node or collocated on a particular node of a distributed network, such as a communications network. As will be appreciated from the following description, and for reasons of computational efficiency, the components of the system can be arranged at any location within a distributed network without affecting the operation thereof. For example, the various components can be located in a Domain Master, a node, a domain management device, such as a MIB, a network operation or management device, a transceiver(s), a station, an access point(s), or some combination thereof. Similarly, one or more of the functional portions of the system could be distributed between a transceiver and an associated computing device/system.

Furthermore, it should be appreciated that the various links, including any communications channel(s)/elements/ lines connecting the elements, can be wired or wireless links or any combination thereof, or any other known or later developed element(s) capable of supplying and/or communicating data to and from the connected elements. The term module as used herein can refer to any known or later developed hardware, circuitry, software, firmware, or combination thereof, that is capable of performing the functionality associated with that element. The terms determine, calculate, and compute and variations thereof, as used herein are used interchangeable and include any type of methodology, process, technique, mathematical operational or protocol.

Moreover, while some of the examples described herein are directed toward a transmitter portion of a transceiver performing certain functions, or a receiver portion of a transceiver performing certain functions, this disclosure is intended to include corresponding and complementary transmitter-side or receiver-side functionality, respectively, in both the same transceiver and/or another transceiver(s), and vice versa.

The examples are described in relation to enhanced communications. However, it should be appreciated, that in general, the systems and methods herein will work equally well for any type of communication system in any environment utilizing any one or more protocols including wired communications, wireless communications, powerline communications, coaxial cable communications, fiber optic communications, and the like.

The example systems and methods are described in relation to IEEE 802.11 and/or Bluetooth® and/or Bluetooth® Low Energy transceivers and associated communication hardware, software and communication channels. However, to avoid unnecessarily obscuring the present disclosure, the following description omits well-known structures and devices that may be shown in block diagram form or otherwise summarized.

While the above-described flowcharts have been discussed in relation to a particular sequence of events, it should be appreciated that changes to this sequence can occur without materially effecting the operation of the example(s). Additionally, the example techniques illustrated herein are not limited to the specifically illustrated examples but can also be utilized with the other examples and each described feature is individually and separately claimable.

The above-described system can be implemented on a wireless telecommunications device(s)/system, such an IEEE 802.11 transceiver, or the like. Examples of wireless protocols that can be used with this technology include IEEE 802.11a, IEEE 802.11b, IEEE 802.11g, IEEE 802.11n, IEEE 802.11ac, IEEE 802.11ad, IEEE 802.11af, IEEE 802.11ah, IEEE 802.11ai, IEEE 802.11aj, IEEE 802.11aq, IEEE 802.11ax, 802.11k, 802.11v, & 802.11r, Wi-Fi, LTE, 7G, 5G, Bluetooth®, WirelessHD, WiGig, Wi-Fi, 3GPP, Wireless LAN, WiMAX, DensiFi SIG, Unifi SIG, 3GPP LAA (licensed-assisted access), and the like.

Additionally, the systems, methods and protocols can be implemented to improve one or more of a special purpose computer, a programmed microprocessor or microcontroller and peripheral integrated circuit element(s), an ASIC or other integrated circuit, a digital signal processor, a hardwired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can benefit from the various communication methods, protocols and techniques according to the disclosure provided herein.

Examples of the processors as described herein may include, but are not limited to, at least one of Qualcomm® Snapdragon® 800 and 801, Qualcomm® Snapdragon® 610 and 615 with 7G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Corte x TMM processors, ARM® Cortex-A and ARM926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with the examples is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed techniques may be readily implemented in software and/or firmware that can be stored on a storage medium to improve the performance of a programmed general-purpose computer with the cooperation of a controller and memory, a special purpose computer, a microprocessor, or the like. In these instances, the systems and methods can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications transceiver.

It is therefore apparent that there have at least been provided systems and methods for enhancing and improving determinations network management actions performed in response to a degradation in SLE metrics by determining whether a network device is classified as an edge device. Many alternatives, modifications and variations would be or are apparent to those of ordinary skill in the applicable arts. Accordingly, this disclosure is intended to embrace all such alternatives, modifications, equivalents and variations that are within the spirit and scope of this disclosure.

What is claimed is:

1. A system comprising:
    a plurality of access point (AP) devices configured to provide a wireless network at a site; and
    a network management system comprising:
        a memory, and
        one or more processors coupled to the memory and configured to:
            determine, based on network data received from the plurality of AP devices, a root cause for an occurrence of a network event;
            determine, based on a determination that the root cause of the network event is associated with an AP device of the plurality of AP devices, a classification of the AP device as an edge device or non-edge device; and
            determine, based on the network event and the classification of the AP device, whether to bypass a network management action for the AP device.

2. The system of claim 1:
    wherein the AP device is classified as an edge device,
    wherein the network event comprises a degradation in network performance, and
    wherein the one or more processors are further configured to bypass a mitigation action with respect to the AP device.

3. The system of claim 1,
    wherein the AP device is classified as a non-edge device,
    wherein the network event comprises a degradation in network performance, and
    wherein the one or more programmable processors are further configured to execute a mitigation action with respect to the AP device.

4. The system of claim 1, wherein to determine the classification of the AP device comprises the one or more processors configured to:
    determine whether the AP device is on a periphery of a graph of the plurality of AP devices; and
    based on a determination that the AP device is on the periphery of the graph of the plurality of AP devices, determine that the classification of the AP device comprises an edge device.

5. The system of claim 4, wherein to determine whether the AP device is on the periphery of the graph of the plurality of AP devices comprises the one or more processors configured to:
    create an AP neighborhood graph having a plurality of nodes, wherein each node represents a corresponding AP device of the plurality of AP devices and each edge between a node representing a first AP device and a node representing a second AP device indicates that the first AP device can receive a signal from the second AP device at a power above a predetermined threshold;
    determine a betweenness centrality value for each node of the plurality of nodes; and
    determine that the AP device is on the periphery of the AP neighborhood graph based on the betweenness centrality value for the node corresponding to the AP device.

6. The system of claim 1, wherein to determine the classification of the AP device comprises the one or more processors configured to:
    for each AP device of the plurality of AP devices, maintain a join count of a number of times that the respective AP device is used by a user equipment (UE) to join the wireless network; and
    determine that the classification of the AP device comprises the edge device based on the join count.

7. The system of claim 1, wherein to determine the classification of the AP device comprises the one or more processors configured to:
    for each AP device of the plurality of AP devices, maintain a leave count of a number of times that a user equipment (UE) associated with the AP device disassociates with the AP device and leaves the wireless network; and
    determine that the classification of the AP device comprises the edge device based on the leave count.

8. The system of claim 1, wherein to determine the classification of the AP device comprises the one or more processors configured to:
    for each AP device, determine a bandwidth utilization of the AP device; and
    determine that the classification of the AP device comprises the edge device based on the bandwidth utilization being below a configurable or predetermined threshold.

9. The system of claim 1, wherein to determine the root cause for the occurrence of the network event comprises the one or more processors configured to determine the root cause for the occurrence of the network event based on an output of a machine learning model.

10. A network management system (NMS) that manages a plurality of access point (AP) devices in a wireless network, the NMS comprising:
    a memory, and
    one or more processors coupled to the memory and configured to:
        determine, based on network data received from the plurality of AP devices, a root cause for an occurrence of a network event;
        determine, based on a determination that the root cause of the network event is associated with an AP device of the plurality of AP devices, a classification of the AP device as an edge device or non-edge device; and
        determine, based on the network event and the classification of the AP device, whether to bypass a network management action for the AP device.

11. The NMS of claim 10,
    wherein the AP device is classified as an edge device,
    wherein the network event comprises a degradation in network performance, and
    wherein the one or more processors are further configured to bypass a mitigation action with respect to the AP device.

12. The NMS of claim 10,
    wherein the AP device is classified as a non-edge device,
    wherein the network event comprises a degradation in network performance, and wherein the one or more processors are further configured to execute a mitigation action with respect to the AP device.

13. The NMS of claim 10, wherein to determine the classification of the AP device comprises the one or more processors configured to:
   determine whether the AP device is on a periphery of a graph of the plurality of AP devices; and
   based on a determination that the AP device is on the periphery of the graph of the plurality of AP devices, determine that the classification of the AP device comprises the edge device.

14. The NMS of claim 13, wherein to determine whether the AP device is on the periphery of the graph of the plurality of AP devices comprises the one or more processors configured to:
   create an AP neighborhood graph having a plurality of nodes, wherein each node represents a corresponding AP device of the plurality of AP devices and each edge between a node representing a first AP device and a node representing a second AP device indicates that the first AP device can receive a signal from the second AP device at a power above a predetermined threshold;
   determine a betweenness centrality value for each node of the plurality of nodes; and
   determine that the AP device is on the periphery of the AP neighborhood graph based on the betweenness centrality value for the node corresponding to the AP device.

15. The NMS of claim 10, wherein to determine the classification of the AP device comprises the one or more processors configured to:
   for each AP device of the plurality of AP devices, maintain a join count of a number of times that the respective AP device is used by a user equipment (UE) to join the wireless network; and
   determine that the classification of the AP device comprises the edge device based on the join count.

16. The NMS of claim 10, wherein to determine the classification of the AP device comprises the one or more processors configured to:
   for each AP device of the plurality of AP devices, maintain a leave count of a number of times that a user equipment (UE) associated with the AP device disassociates with the AP and leaves the wireless network; and
   determine that the classification of the AP device comprises the edge device based on the leave count.

17. The NMS of claim 10, wherein to determine the classification of the AP device comprises the one or more processors configured to:
   for each AP device, determine a bandwidth utilization of the AP device; and
   determine that the classification of the AP device comprises the edge device based on the bandwidth utilization being below a configurable or predetermined threshold.

18. The NMS of claim 10, wherein to determine the root cause for the occurrence of the network event comprises the one or more processors configured to determine the root cause for the occurrence of the network event based on an output of a machine learning model.

19. A method comprising:
   determining, based on network data received from a plurality of access point (AP) devices, a root cause for an occurrence of a network event;
   determining, based on a determination that the root cause of the network event is associated with an AP device of the plurality of AP devices, a classification of the AP device as an edge device or non-edge device; and
   determining, based on the network event and the classification of the AP device, whether to bypass a network management action for the AP device.

20. The method of claim 19,
   wherein determining the classification of the AP device comprises determining that the AP device is an edge device,
   wherein the network event comprises a degradation in network performance, and
   further comprising bypassing a mitigation action with respect to the AP device.

* * * * *